(12) United States Patent
Frankel

(10) Patent No.: US 10,198,747 B1
(45) Date of Patent: Feb. 5, 2019

(54) CONSUMER ADVERTISING CONTROL METHOD

(71) Applicant: Noel Frankel, New York, NY (US)

(72) Inventor: Noel Frankel, New York, NY (US)

( * ) Notice: Subject to any disclaimer, the term of this patent is extended or adjusted under 35 U.S.C. 154(b) by 0 days.

(21) Appl. No.: 15/819,614

(22) Filed: Nov. 21, 2017

Related U.S. Application Data

(63) Continuation-in-part of application No. 15/098,703, filed on Apr. 14, 2016, now abandoned.

(51) Int. Cl.
*G06F 17/30* (2006.01)
*G06Q 30/02* (2012.01)
(Continued)

(52) U.S. Cl.
CPC ..... *G06Q 30/0258* (2013.01); *G06F 3/04817* (2013.01); *G06Q 30/0269* (2013.01); *H04L 61/2007* (2013.01)

(58) Field of Classification Search
CPC ............. G06Q 30/0258; H04N 21/812; H04N 21/2668; H04N 21/4532; H04N 21/6582; H04N 21/8456; H04N 21/25883; H04N 21/25891; H04N 21/4316; H04N 21/44222; H04N 21/4312; H04N 21/4722; H04N 21/482; H04N 21/6125; H04N 21/4314; H04N 21/44204; H04N 21/4725; H04N 21/4755; H04N 21/47815; H04N 21/23424; H04N 21/2387; H04N 21/2542; H04N 21/41407; H04N 21/458; H04N 21/47217; H04N 21/4756; H04N 21/4782; H04N 21/4828; H04N 21/8586; H04N 21/25841; H04N 21/4122; H04N 21/4223; H04N 21/42684; H04N 21/44008; H04N 21/44016; H04N 21/44218; H04N 21/478; H04N 21/4784; H04N 21/6587; H04N 21/84; H04N 21/858; H04N 21/2187; H04N 21/222; H04N 21/23418; H04N 21/23439; H04N 21/2543; H04N 21/4126; H04N 21/4147; H04N 21/4182; H04N 21/4227;
(Continued)

(56) References Cited

U.S. PATENT DOCUMENTS 7,027,801 B1 * 4/2006 Hall ................. G06Q 30/02
455/412.1
7,653,198 B2 * 1/2010 Sako ................ G11B 20/00086
380/239
(Continued)

*Primary Examiner* — Sheree N Brown

(57) ABSTRACT

The primary consumer objection to digital advertising is solved when content providers grant users control of the quality and relevance of ads for preferred products and services, and when and how often these ads are displayed. The invention grants users control of all advertisements on digital media platforms, as the platforms do not display advertisements. However, they do permanently display a command button icon that is initiated by the user to display advertisements, and in response to only the indicated single action being performed, the user sends a request to display advertisements. In addition, the same command button icon may be initiated by the user to remove advertisements. The method prompts user to engage in advertising for preferred products and services through paradigm shifts in permission-based marketing, e-commerce, and gamification.

13 Claims, 16 Drawing Sheets

(51) Int. Cl.
*H04L 29/12* (2006.01)
*G06F 3/0481* (2013.01)

(58) Field of Classification Search
CPC ............. H04N 21/432; H04N 21/4333; H04N 21/4334; H04N 21/4524; H04N 21/4542; H04N 21/4667; H04N 21/472; H04N 21/47205; H04N 21/4753; H04N 21/4788; H04N 21/4821; H04N 21/485; H04N 21/4882; H04N 21/64322; H04N 21/8173; H04N 21/8547; H04N 21/8549; H04N 5/44543; H04N 5/783; H04N 7/163; H04N 7/17318; H04N 2005/4419; H04N 2005/44556; H04N 21/23406; H04N 21/2393; H04N 21/24; H04N 21/2407; H04N 21/252; H04N 21/2547; H04N 21/25866; H04N 21/262; H04N 21/26225; H04N 21/26241; H04N 21/26258; H04N 21/266; H04N 21/26603; H04N 21/2743; H04N 21/2747; H04N 21/414; H04N 21/42207; H04N 21/4221; H04N 21/42224; H04N 21/4263; H04N 21/433; H04N 21/4331; H04N 21/4335; H04N 21/435; H04N 21/4355; H04N 21/4383; H04N 21/44004; H04N 21/441; H04N 21/442; H04N 21/454; H04N 21/45455; H04N 21/462; H04N 21/4622; H04N 21/4661; H04N 21/47202; H04N 21/47214; H04N 21/4751; H04N 21/4781; H04N 21/4858; H04N 21/4884; H04N 21/632; H04N 21/643; H04N 21/6543; H04N 21/8455; H04N 21/8543; H04N 5/247; H04N 5/44591; H04N 5/76; H04N 5/782; H04N 7/162; H04N 7/165; H04N 9/7921
USPC ........................................ 705/14.73
See application file for complete search history.

(56) References Cited

U.S. PATENT DOCUMENTS 9,639,859 B2 * 5/2017 Jung ..................... H04W 4/02
2012/0110616 A1 * 5/2012 Kilar .................... H04N 21/812
725/32

* cited by examiner

CONSUMER ADVERTISING CONTROL METHOD

The present Application for Patent claims priority to Provisional Application No. 61/757,741 filed 29 Jan. 2013.

BACKGROUND OF THE INVENTION

Field of the Invention

The invention relates to methods and systems used to advertise and market products and services on a digital content platform (DCP), and, more particularly, how consumer control of the display and integration of advertising across advertising-supported digital content platforms eliminates, upon user discretion, unwarranted and intrusive advertising while deriving the benefits of targeted advertising based on permission-based personally identifiable information (PII).

Description of Prior Art

Today, in addition to allowing the advertisers, ad networks, data aggregators, and ad exchanges to view and manage data regarding users' interactions with their content, these entities often store information about users to use for targeting advertising. This information, which ranges from simple opt-out preferences, to information about users' behaviors and interests, approximates the methods of the prior art cited by the U.S. Patent and Trademark Office in regard to the present invention. The USPTO references Goldhaber et al. (U.S. Pat. No. 5,794,210), and Zorman et al. (U.S. 2009/0234732), both of which underscore the utility, novelty and nonobviousness of the present invention disclosed herein.

The Office specifically referenced the Goldhaber "Cyber-Coin" as a method to display and remove advertisements, whereas the plurality of CyberCoin clicks needed (a plurality more than two in number) failed to teach the global "on/off" two-click solution of the present invention, ergo the applicant successfully argued nonobviousness over Goldhaber et al.

However, in regard to Zorman et al., the Office discounted the rebuttal evidence and arguments presented in the specification, which specified the nonobviousness of the present invention, as the GUI command button icon requires only a single action for the "on/off" and off means all advertising is off, which takes it out of being a menu with user options or a teaser, whereas Zorman discloses: "interactively presenting options to the user to opt-in to the advertisements [0033]," as the reason for the rejection. The two-click solution of the present invention is predicated on user control of the global display of all advertising on a DCP, without offering subsequent options, requirements, and conditions, which underscores the precision and utility of the two-clicks to display and remove advertising. Zorman, on the other hand, fails to indicate how such "opt-out of all advertising" occurs (e.g., the plurality of clicks needed to globally "opt-out" of all advertising), let alone "opt" back in. Zorman provides even less specificity and objective clarity than Goldhaber, while the present invention adds a specific limitation other than what is well-understood, routine, conventional activity.

Further, at the time of the invention, granting consumers total control of the display of advertising would have been nonobvious to one having ordinary skill in the relevant art. As with Goldhaber, modifying Zorman to inform users that choosing not to display ads while still granting unconditional access to all digital content on the platform, would be antithetical to the advertising industry as a whole. In fact, at the time of the invention, according to the "The Importance of Being Seen: Viewability and Brands," brand marketers since the "Mad Men" era have often sought insight to a simple question: Was my ad seen?

Moreover, MPEP 2142 confirms the meaning of prima facie case in the context of obviousness: "The examiner bears the initial burden of factually supporting any prima facie conclusion of obviousness." See also, *Ex Parte Poisson* (PTAB Appeal No. 2012-011084, Feb. 26, 2015)) ("absent supporting evidence in the record—of which there is none, the examiner's opinion is an inadequate finding of fact on which to base the Alice analysis" . . . )

However, today, both Goldhaber and Zorman are indicative of the issues facing the advertising industry. It is next to impossible for consumers to manage advertising preferences globally. For example, there is no easy way for a consumer to define a global policy that limits targeted advertising to companies that do not share their data with third parties or have well-enforced privacy policies. To do so, users typically must visit the privacy policy pages of a number of ad networks, understand each networks' policies, and opt-out individually of them by locating the 'opt out link' on each of those web sites, which, coincidentally, to those skilled in the relevant art at the time of the invention, mirrors the failed Zorman methodology. In addition, simply finding out which ad networks and companies are responsible for the ads is problematic. A most recent incident, Turn Inc. enabled sellers to target digital ads that continuously targeted consumers even after they opted-out. The company's privacy policy told consumers they could block targeted advertising by using their web browser's settings to block or limit cookies. However, the company used unique identifiers to continuously track users even after they opted-out. Even though advocates and regulators exert pressure on companies to expose to users exactly what they know about them, and provide a way to add, delete, and edit that information, consumers still have to visit each of those companies' web site separately to perform these actions. However, the claimed two-click solution of the present invention is necessarily rooted in computer technology in order to overcome the difficulty consumers face specifically arising in the realm of computer networks.

As referred to above, the consumer's opt-out status (or other targeting preferences) must be known with regard to a particular content network or ad network, and/or tracking system in order to accurately implement and monitor online behavioral advertising guidelines. To address this need, the present invention provides a secure, scalable approach to provide consumers global control of the display of advertising across the entire advertising ecosystem, without tying up the judicial exception, as the claims do not wholly pre-empt the field and post no risk of pre-emption, because, as enumerated herein, non-infringing alternatives are significant and substantial. However, while many advertising ecosystem entities currently use the Network Advertising Initiative's ("NAI") opt-out tool, which uses a HTTP redirect mechanism to identify opt-out status, the architecture and methods of the present invention provide a more secure and scalable standard for any service provider to operate with entities that store data about consumers and their ad targeting preferences.

Today, information from patents can be used to reveal different trends and emerging areas related to web based targeted advertisements. Various organizations have been filing patents related to targeted advertisements. The analysis of the patenting activity reveal that advertisements are targeted based on various criteria such as user profile, user location, events/environments, etc. that are related to user. Patents related to the usage of user profile for targeted advertisement are predominant. Further in-depth study reveal use of social network as an emerging area for targeting consumers. Although Microsoft appears to be leading in this area, Sony has more patents in the specific domain that makes use of events environments and vehicular movement for targeting advertisements. All though most of the web based technologies are generalized for wide range of products and services, there also exist specific web based targeting advertising related to travel related products/services, banking, insurance and automobiles. Examples of patents granted for online targeted advertising include Managing and monitoring digital advertising U.S. Pat. No. 9,361,631 B2; Targeting online ads based on political demographics U.S. Pat. No. 8,763,033 B2; Method for targeted advertising on the web based on accumulated self-learning data, clustering users and semantic node graph techniques U.S. Pat. No. 6,714,975 B1; Internet advertising with controlled and timed display of ad content from centralized system controller U.S. Pat. No. 6,128,651; Targeted television advertisements selected on the basis of an online user profile and presented with television programs or channels related to that profile U.S. Pat. No. 8,607,267 B2.

As a result of behavioral advertising companies, advertising networks have automated the delivery of online advertisements, creating real-time marketplaces wherein advertisers bid on display ad impressions. In general, real-time bidding (RTB) networks claim advertisers achieve greater efficiency, delivery of audience targeting, and scalable reach. However, banner ad growth in 2017 is projected to be +7% (Iron Paper). The average click thru rate for banners is 0.06% (Google). As many as 60% of clicks on banner ads are accidental (Media Week). Only 9% of digital ads are viewed more than 1 second (Marketing Week). 25% of consumers use ad blockers, up 34% vs. previous year (eMarketer). One-third of ad-block users find display ads completely intolerable (Pagefair). 90% of ad clicks are by "bots" (Facebook). Consumers are served more than 1,700 banner ads per month (Comscore). Once a digital banner ad reaches the same person 40 times or more in a month, sales can actually decline (The Advertising Research Foundation). Advertisers are more likely to survive a plane crash or win the lottery than have someone click on their banner ad (Business Insider). 28% of marketers have reduced their ad budgets and shifted to other forms of marketing (Gartner). 12. 54% of internet users have never clicked a banner ad because they don't trust them. (BannerSnack). By 2019, mobile advertising will represent 72% of all U.S. digital ad spending. (Payfirma). Digital video ad spend will exceed TV ad spend for the first time this year. (Contently). 8 percent of Internet users account for 85 percent of clicks. (ComScore). 25-34-year olds see 2,094 banner ads per month. (ComScore). Consumers are more likely to birth twins than click a banner ad. (Solve Media). Consumers are more likely to complete NAVY SEAL training than click a banner ad. (Solve Media). Consumers are more likely to summit Mount Everest than click a banner ad. (Solve Media). Consumers are more likely to get into MIT than click a banner ad. (Solve Media). Only 30% of consumers trust search engine ads. (MediaPost). Just 22% of consumers trust emails from companies or brands. (MediaPost). Only 13% of consumers trust ads on websites. (MediaPost). Only 32% trust ads in any channel. (MediaPost). 32% of survey participants said they trust information on company or brand Web sites. (MediaPost). 24% said they trust ads in newspapers (MediaPost). 23% said they trust ads on TV. (MediaPost). 22% said they trust ads in magazines. (MediaPost). 20% said they trust in radio. (MediaPost). 20% said they trust emails from brands or companies. (MediaPost). 18% said they trust posts by brands or companies on social sites. (MediaPost). Consumers trusted the messages in text message ads the least at 12%. (MediaPost). Display ads account for a mere 0.9 percent of upstream traffic to department store sites. (L2). Brand marketers will account for just 27 percent of online display ad spending by 2018, down from 31 percent in 2011. (Forrester). Mobile devices account for just 40 percent of advertising spending. (Hubspot). The U.S. accounts for a quarter of global online display impressions. (DoubleClick). Video ads account for 3% of time spent viewing video online. (ComScore). Clicks on banner ads have the lowest correlation with conversion. (ComScore). The Internet accounts for 26 percent of U.S. consumer interaction with media, and 22 percent of advertising spending. (Mary Meeker). Over 5.3 trillion display ads were served to U.S. users. (ComScore). That's 1 trillion more than 2010. (ComScore). The standard 468×60 banner has a 0.04 percent click rate. (DoubleClick). An estimated 50% of ad impressions can't be viewed by users. (Comscore). 15% trust banner ads compared to 29% for TV ads. (eMarketer). 34% don't trust banner ads at all compared to 26% for magazine ads. (eMarketer).

Basically, findings show that users don't accept advertising and tracking because they don't mind; they accept it grudgingly because they don't know how to avoid it, though they dislike it even more than they do spying by government agencies that prompted a series of national scandals. (Pew Research Center). In fact, recent user backlash against ads has been so severe that the Interactive Advertising Bureau recently issued an apology.

Television ad-skipping has become a common practice. Viewers switch channels with remote controls and fast-forward through TV spots with the digital video recorders. (DVR). Because advertising is a primary revenue for basic TV networks (unlike subscription services), ad-skipping concerns television content providers. Video on demand (VOD) and video streaming on computers and mobile devices, fragments TV viewership and further erodes ad-supported models.

From a business perspective, Facebook dominates online ad sales. Last year, the platform increased its digital advertising revenue by 62 percent, and it's expected to haul in more than $33 billion in ad sales this year. Facebook and Alphabet—Google's parent company—combine to soak up 85 percent of all new digital ad sales. This digital advertising ecosystem comprises an unleveled playing field vastly favoring the duopoly of Google and Facebook. They set the rules and use undue influence. Publishers and marketers alike reinforce the walled gardens of these duopolies, enabling the continued growth of these two companies, while simultaneously eroding their own revenue and ability to compete.

BRIEF SUMMARY OF THE INVENTION

In accordance with the present invention, the primary problems of the prior art are solved when independent publishers grant users control of when and how often all advertisements and commercial messages are displayed on their platforms. These publishers, comprising the third-party ecosystem, arguably offer the same data, scale and capabilities, but are broadly fragmented across partners, technology platforms, and content landscapes. To this end, a preferred embodiment of the present invention propagates the independent DCP ecosystem, through cloud computing, with targeted, user-centric advertising cohorts. Another embodiment proposes a commercially branded online network of ad-supported content that collectively grant user control over the display of marketing assets across all platforms, without restriction to ad-supported digital content. This non-transitory computer-readable media method gives advertisers access to user databases of favorite merchandise and e-commerce opportunities on myriad digital devices simultaneously, with persona-based targeted ads that are relevant to users and much less invasive, in comparison to current advertising methods.

Total user control of the display of advertising on ad-supported content platforms will undoubtedly satisfy users, while, at the time of the invention, to those of ordinary skill in the relevant art, it belied the very definition of advertising, as "the act or practice of calling public attention to one's product, service, need, etc., especially by paid announcements in various media."

In regard to the above, it is worth noting that on May 5, 2016, the USPTO released an update to its examiner guidance on patent subject matter eligibility, which, in part, read as follows: "Examiners should keep in mind that the courts have held computer-implemented processes to be significantly more than an abstract idea (and thus eligible), where generic computer components are able in combination to perform functions that are not merely generic (DDR)."

Further, in respect to patent-eligibility, a preferred embodiment of the invention, the single user action of the GUI, constitutes the "on" of the "on/off" action, requesting the server to display advertisements; and initiating a subsequent single user action of said GUI, constitutes the "off" of the "off/on" action of the GUI, requesting from the server to remove all advertisements on the DCP. Which is why the inventive concept transforms an abstract idea into a patent-eligible invention.

A preferred embodiment of the present invention is a client system, permanently displayed graphical user interface GUI which does not constitute "advertising" as persons having ordinary skill in the art recognize the long established and unambiguous differences between graphical user interfaces and advertising.

Although a person with ordinary skill in the pertinent art would not be drawn to the nonanalogous art elements of the toggle light switch, patented in 1917, the applicant respectively references this innovation in an attempt to illuminate the nonobviousness and utility of the present invention. The toggle light switch two-clicks turned a light source "on" and "off," improving upon the earlier push-button switch, which required two actionable "command buttons" to achieve the same result. The two click novelty of the present invention provides users display of all advertising on digital media platforms through the simplest possible method which, in the modern technological era, constitutes a specific utility that is no less abstract than the toggle light switch of the early twentieth-century.

A DCP grants user control of all ad views through a preferred embodiment which performs globally on the digital media platforms, including mobile phones and tablets, desk and laptop computers, and cable modem and Internet-ready televisions.

User control of advertisements will help alleviate the misuse of information collected by RTB operations and the risks associated with online exposure of personal information. The present invention replaces information inferred by online activities, demographic data, and invasions of privacy, relying instead on permission-based marketing and the myriad inducements it produces to prompt user engagement of advertising messages, as well as improved return on investment for content publishers and advertisers worldwide.

DETAILED DESCRIPTION OF THE INVENTION

Figure 1:
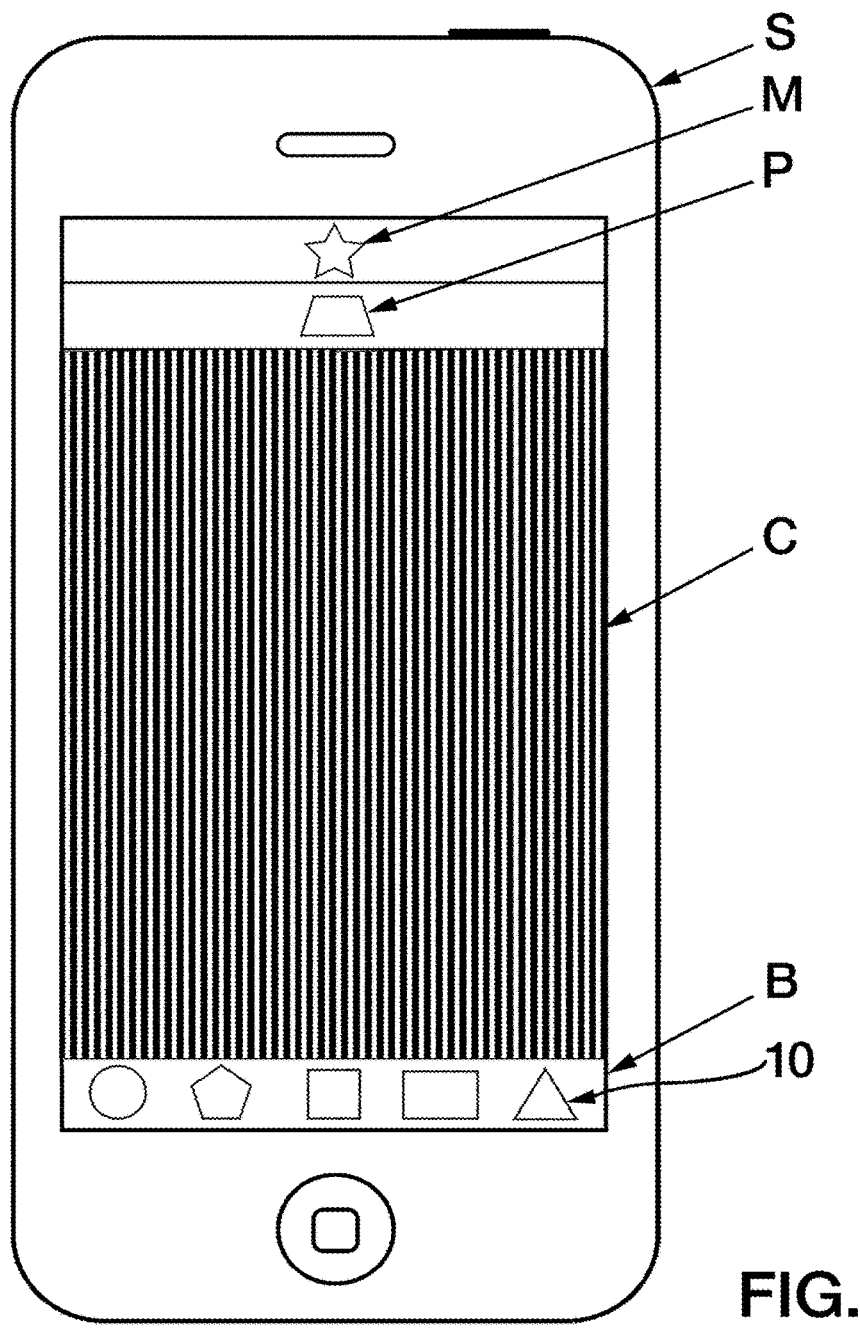
FIG. 1 is a depiction of a mobile phone to illustrate exemplary user advertising control method.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

The term "digital content platform" may be a platform on a personal computer, a desktop computer, a mobile computer, a laptop computer, a set-top box, a notebook computer, a tablet computer, a personal digital assistant (PDA), mobile phone, cable modem and Internet-ready televisions, or any other suitable digital content device. Typically, a computer includes or is operatively connected to means for connecting the computer to another computer via a network, for example, the Internet.

Specific details are set forth in the following description in order to provide a thorough understanding of the invention. For the purpose of clarity, however, digital technology that is known in fields of advertising and media related to the invention has not been described in detail so that the present invention is not unnecessarily obscured.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Unless explicitly stated, the method embodiments described herein are not constrained to a particular order or sequence. Additionally, some of the described method embodiments or elements thereof can occur or be performed at the same point in time.

The term "opt out" used in this patent application specification should be expansively and broadly construed to include any blocking, avoiding or otherwise preventing a serving, reception and/or acceptance of digital content. The terms opt out, blocking, preventing or avoiding may be used interchangeably in this patent application specification.

The term "opt in" used in this patent application specification should be expansively and broadly construed to include any allowing, permitting or otherwise enabling a serving, reception and/or acceptance of digital content. The terms opt in, allowing, permitting or enabling may be used interchangeably in this patent application specification.

Therefore, without being bound by theory, or limited by lack of precise jargon, the description of the invention below is intended to be understood as being operable in the context of known means for operating a personal computer, a desktop computer, a mobile computer, a laptop computer, a set-top box, a notebook computer, a tablet computer, a personal digital assistant (PDA), mobile phone, cable modem and Internet-ready televisions, or any other suitable digital content device, and as currently used, but lacking in the inventive features of the present invention.

According to broad industry consensus, technological advances in the new millennium have yet to benefit ad-supported digital advertising.

The present invention improves upon the delivery, participation, satisfaction and profitability of the prior art through a method that represents the interests of three interdependent constituencies simultaneously: 1) The advertiser and e-commerce marketer of products and services; 2) The ad-supported content provider on digital media platforms, and 3) The user, e.g., the majority of online demographic and socioeconomic groups.

According to embodiments of the invention, it runs in a client/server environment, whereas a client computer contacts a server, which provides services to the client computer. These services mitigate the primary user objection to the prior art when content providers grant users control of the quality and relevance of ads for preferred products and services, and when and how often these ads are displayed. A preferred embodiment for user control of all advertisements on digital media platforms comprises a method wherein digital media platforms do not display any advertisements; however, they do display a GUI that is to be initiated by the user to display advertisements, and in response to only the indicated single action being performed, the user sends to a server system a request to display advertisements. In addition, the same GUI may be initiated by the user on the DCP displaying advertisements to remove all such advertisements globally, and in response to only the indicated single action being performed, the user sends to a server system a request to remove the all advertisements.

Another preferred embodiment links user-centric advertising to the Personally Identifiable Information (PII) by performing Big Data analytics. For example, a person's purchase data (e.g., from credit cards, customer loyalty cards, and the like), media consumption data (e.g., TV viewing data, Internet media streaming data, iTunes media data), web browsing data, tax filing data, social network data, calendar data, e-mail data, Twitter data, geo-location data, travel history, photo data, medical data, criminal record data, DNA data, employment data, and the like can be analyzed determine a person's interests and objectives. Based on this analytics, a user-centric, permission-based advertising profile can be generated. However, digital content providers lack easy ways of offering transparency to users regarding how personal data is processed, even if their intentions are to make their platforms more privacy friendly. To address these challenges, the present invention offers user control of the display of advertising, leaving the user with the option of deleting their profile at any time.

In view of the foregoing, a non-transitory computer readable storage method is provided for determining, among other steps, a match between a user and advertising preferences, based on a personal profile, to generate user-centric marketing information. Further, a preferred embodiment of the non-transitory computer-readable medium includes executable instructions that when executed by a processor cause the processor to effectuate a method. This method may include obtaining raw data from a plurality of different data sources; analyzing the raw data to identify one or more data structures of the raw data and to tag data identifying at least one of the plurality of different data sources; generating a plurality of Universal Data Model (UDM) constructs, each UDM construct being based at least in part on the one or more data structures of the raw data and each UDM construct excluding the source-identifying data. Because the claims recite a "non-transitory" computer-readable method, which addresses a potential 35 U.S.C. § 101 rejection, the applicant respectfully submits that a "non-transitory" computer-readable method comprises all computer-readable media, with the sole exception being a transitory, propagating signal, i.e., register memory, processor cache and RAM.

Behavioral advertising is consigned to real-time buying (RTB), one ad network alone can hyper-target as many as 12 billion ad impressions daily, which, as previously noted, may only serve to elevate user resentment and ad avoidance. The nation's largest media and marketing trade associations, with support from the Council of Better Business Bureaus, have met for years to promote self-regulatory approaches to the collection of data used to drive behavioral ad models. However, as the prior art has shown, data collection is not the problem, but rather the frequency, relevance and quality of the ads that metadata provokes. The inventive matter herein empowers users to leverage their personal data against elective ad views of preselected, favorite brands, qualifying ad delivery, which, as an intended result, improves advertiser and content publisher return on investment.

Another embodiment of the invention may employ a permission-based marketing method in a Real Time environment, inserting on digital content platforms on a plurality of computers in real time on an impression basis. When a user has accessed the GUI to display advertising, advertisements start an online process to determine which product attributes best match the user-centric profile. A preferred embodiment of the invention is the intersection of a Real Time environment, PII, and user control of all advertisements on content provider platforms, which solves a major obstacle faced by advertisers trying to deliver highly targeted and customized marketing to receptive audiences. The difficulty of gathering and activating relevant, timely and accurate user information from diverse and often inconsistent sources is eliminated, because the present invention performs highly accurate entity resolution using that PII, and returns one or many requested data bundle enhancements associated with that PII—all in a single Application Programming Interface (API) call.

An embodiment of the invention employs a permission-based marketing method that incentivizes users to view advertisements, for which digital content providers have obtained permission from users to source highly accurate personal information regarding their preferred products and services at relevant price points. Derived from commercial databases that practice enterprise data mining and analytics, user information is retrieved, via access permissions, from servers that can process more than 50 trillion data "transactions" a year, and contain profiles of approximately 500 million active users worldwide, with about 1,500 data points per person, including a majority of adults in the United States. The present invention relies on user-centric data to offer the relevancy of user brands and band introductions that may be of interest to the user, while respecting the privacy of users by offering the ability to control the display of all ads with the single action of the GUI. In regard to the user data of the present invention, it comes from three different sources: (1) government records, public records and publicly available data, (2) self-reported data, and 3) data from other commercial entities where users have been provided notice of how their data will be used, and offered a choice about whether or not to allow those uses. The data includes public record and publicly available data from such sources as telephone directories, content platform directories and postings, real property recorder and assessor files, and government licenses. Data from other providers includes demographic data, surveys and questionnaires, and summarized or aggregated purchase data. As a result, the present invention provides users with more relevant advertising, better service, improved offerings and special promotions, for online and mobile targeting and content platform personalization. Opting out will reduce the relevance of offers users receive from companies with which they have done business. Sensitive data such as social security numbers and driver's license numbers are not included. Personally identifiable information about children younger than 18 will be screened out. However, the presence of children in a household by age ranges is included. PII includes Individual data name, address, telephone number, email address, gender, education level, occupation, voter party, ethnic code/language preference, Age in two-year increments, date of birth Note: Ethnic code/language preference is derived from last name or comes from a survey a user has completed. Full date of birth is only provided in limited instances and for specific purposes, such as life insurance marketing. Typically, only age or year or month/year is used. Household demographics adult age ranges, children's age ranges, number of adults and number of children in the household, marital status, household interests, interest categories include reading, food/cooking, travel, exercise, health/self-improvement, hobbies, pets, sports, collectibles, investments, computers, electronics, home improvement, games/contests, photography, etc. Note: These variables are obtained from surveys a user or someone in a user's household completed or are derived from inquiries or purchases a user has made. A household can have multiple characteristics. household purchase, behavior purchase indicators and characteristics include frequency of purchase indicator, types of purchases indicators, retail and mail-order buyer indicators, charitable giving indicator, community involvement indicator, media channel usage indicator, buying channel preferences, average direct mail purchase amount, direct mail frequency indicator, types of stores indicator. Note: Types of purchases indicator includes such categories as apparel, home improvements, books, computers/electronics and small appliances. Types of stores indicator includes standard retail, specialty and upscale. household life event data new parent, expectant parents, new teen driver, college graduate, empty nester, new mover, recent home buyer, recent mortgage borrower, getting married, divorced, child leaving home, buying a new car Note: This data, for example, is obtained from self-reported surveys or derived from public records. Within the scope of the present invention, this information informs the relevancy of highly targeted advertisements on digital media platforms.

An improvement in the field, the inventive matter includes a non-transitory computer readable storage method that grants users control of RTB behavioral advertising as well as the ads that result from permission-based marketing, such as PII API data.

In the prior art, permission-based marketing is synonymous with opt-in emails, which are primarily ads for products and services, i.e., spam, with an "unsubscribe" user option once the email is received. In essence, the only permission granted by marketers is to opt out after receiving unsolicited emails from reportedly legitimate lists that reportedly "blast" as many as 30 million "opt in" emails at one time.

According to preferred embodiments of the invention, a value proposition dialog box is displayed upon user log in that informs the user of the benefits of engagement with a DCP, which (1) gives user total control of the display of all advertisements on the DCP, including but not limited to the value proposition dialog box advertisement for the DCP, and (2) that the display of all advertisements requires initiating a single user action of the permanently present GUI, which constitutes the "on" of the "on/off" action of the command button, whereas a subsequent single user action of the same GUI removes all advertisements, constituting the "off" of the "off/on" action of the command button. This answers a challenge particular to the Internet, so the solution is not routine or conventional. Digital marketers have unleashed powerful and far-reaching data collection, profiling, and targeting technologies online, incorporating the latest developments in such fields as semantics, artificial intelligence, auction theory, social network analysis, data mining, and neuroscience. Consumers and policymakers, however, are largely unaware of how online advertising operates nor are they prepared to assess the impact of tracking technologies that monitor our travels on the Internet and generate information for digital targeting profiles. Unlike more traditional advertising, digital marketing watches us, relying on such techniques as data optimization, "self-tuning" algorithms, "intent" data, and "immersive" multimedia to enable personalized, highly targeted marketing. Such marketing has also been integrated into the core business models of social networks, mobile communications, gaming platforms, virtual worlds, and online video. With the repeated failure of industry self-regulation, strong privacy safeguards can only come with total consumer control of the display advertisement on digital content platforms, including provisions that fully apprise consumers of the privacy benefits of the present invention.

According to embodiments of the invention, choosing the value proposition gives the DCP permission to access user PII, derived from enterprise data, for the express purpose of providing user with advertisements for preferred brands as well as advertisements for brands that may be of interest to user. A user may choose to reject the value proposition, whereas the DCP would be denied permission to access the PII. However, user will still have unconditional access to all the digital media on said DCP, and will not be required to perform any additional actions.

An example of the value proposition may be in all or part of the following:

When you choose the value proposition, you stay connected to all [DCP] has to offer, and you decide when and how often to view ads.

By choosing the [DCP], your personal information links you to a world of savings. Simply click [GIU].

Then click the [GUI] again, and you'll bank [DCP] virtual dollars the moment you do. Spend them on your favorite stuff. Buy gifts and save up for big purchases.

And when you click the products logos, you could win great prizes on the spot!

If you reject the value proposition, you can still enjoy [DCP] without ever seeing ads. (Although you won't know what you're missing!)

(Note: The GUI may conform to interface of DCP, e.g. top or bottom of screen, on a menu bar, and be of any typography, color, size, shape, or style of GUI.)

The permission-based embodiment incentivizes users to view ads on DCPs that have obtained user permission to source highly accurate personal information pinpointing favorite brands. In this regard, permission-based marketing becomes precision-based marketing, inasmuch as user may choose to view ads for preselected merchandise.

The aforementioned preferred embodiment grants users the opportunity to view the content on ad-supported DCPs without the presence of ads. The present invention places the onus on the inventive matter described herein, in association with content providers and the advertising community, to make advertising as welcome, compelling, and valued to the user as the content it supports.

Regarding privacy concerns, so far the United States has chosen to approach the issue using a market-based, self-regulatory approach. Rather than passing complex laws to remedy online privacy, the government will step aside and allow online businesses to regulate themselves, primarily through their own privacy policies.

The inventor ascribes to the self-regulatory privacy approach, asserting that the present invention grants users stronger privacy protections on the digital media platforms they currently frequent. Moreover, businesses will profit from inventive privacy controls that win user trust through (1) user-centric privacy control; and (2) the prevention of human intrusion by using automation wherever possible, for improved eCRM (electronic customer relationship management).

According to embodiments of the invention, the user advantage of granting permission is predicated on a desire to be apprised of time-sensitive opportunities regarding favorite brands, e.g., preferred coffee, paper towels, cereal, applesauce, automobiles, vacation destinations, and authors.

In accordance with the invention, an embodiment is the inclusion of e-commerce marketers on digital content platforms, offering ads with proprietary incentives that users may elect to preview prior to purchasing favorite brands. Unlike merchandizing platforms, such as Amazon and EBay, which work on predetermined shopping models, the embodiments of the invention prompt impulse buying, as users typically weigh the instant gratification of an impromptu buy on content platforms.

To promote both behavioral advertising and permission-based marketing, the invention supports advertisers and marketers that offer promotional inducements including but not limited to sales, prizes, awards of preferred merchandise, and gamification marketing, which reflects America's $69 billion annual lottery spend, sports betting, nationwide Las Vegas-style gaming, and bingo.

A preferred embodiment of gamification is the graphical Teaser Icon (TI), which, in regard to the inventive mater of the present invention, constitutes advertising which is displayed (and subsequently removed) by user initiation of the command button icon, as a user engages the icon to display and remove all such advertising. In 1926, a print ad with the headline, "They Laughed When I Sat Down at the Piano but When I Started to Play-" was voted by many contemporary copywriters as the best of the 20th century. It introduced the concept of how catchy headlines, arresting visuals, and punchy body copy working in tandem can attract and engage users. Ninety years later, the ad model still persists, in the form of online banner and display ads, although today's advertising professionals seek a viable creative execution that reflects both the limitations and advantages of technological advances. While advertising technology continues to flummox users, manufacturers, and content publishers, billions of ad dollars have been spent down through the years creating myriad preferred brands across all demographic and socioeconomic groups worldwide. In fact, global consumers are more likely to buy new products from familiar brands, which further validates the user impulse to view ads for favorite brands, solely at their own discretion, as described herein.

According to some embodiments of the invention, the Teaser Icon capitalizes on the minimal mobile ad space allotted to sell merchandise. Standalone teaser ads have been a staple of prior art. But on web platform landing- and sub-pages, typically an unsightly mix of competing ads and commercial messages scattered among the content, the teaser ad becomes one of many ads competing for attention. But the Teaser Icon, when chosen to appear by a consumer, is assigned to a specific, designated area within the content on digital media platforms. Teaser Icons are comprised of a series of teasers, e.g., brand logos of favorite products, a series of teaser ad headlines for said products, or a series of visual representations (such as a photograph or illustration sans written description), or any combination of teasers thereof, offering users a choice of Teaser Icons to choose from. In this regard, the gamification aspect is heightened, inasmuch as the user can pick only one Teaser Icon at a time, e.g. the game show, what's behind door number one, door number two and door number three.

The gamification embodiment includes an animated component, wherein a unified set of Teaser Icons (e.g., logos of familiar, preferred brands) continually cycle through the designated ad space. Each time the content platform is refreshed so are the teasers, which may represent either the same products and services, a series of brands, or a combination of both, prior to new data update. The inventive matter of the embodiment is substantiated by a recent global study of more than 29,000 respondents, which found that more than half (60%) of consumers around the world with Internet access prefer to buy new products from a familiar brand than switch to a new brand. Ergo, a user preference for familiar brands indicates that a logo or visual representation of a favorite brand would improve click-through and conversion rates.

Although the inventor acknowledges that the promotional vehicles enumerated in the application may be online marketing staples, they do not read on the prior art, or any combination thereof, because these promotions are subject to a series of nonobvious method steps, e.g., user control over their display without restriction to ad-supported digital content.

To further prompt e-commerce purchases, the invention includes a preferred embodiment user rewards program consisting of virtual dollars, wherein the inventive virtual dollars are defined as the markdown dollar amount of a product or service, i.e., the difference between the original retail price and the reduced price, converted into virtual dollar terms, e.g., $1.00 U.S. dollar=$1.00 Virtual Dollar. Virtual Dollars are used in combination with U.S. currency to purchase merchandise and services at the markdown price, wherein the Virtual Dollar pays the markdown, and U.S. currency pays for sale price. Virtual Dollars are accrued as an aggregate of the total markdowns offered on products and services sold at discount through participating e-commerce marketers on a content provider's DCP, whereas Virtual Dollars are disseminated to consumers to purchase said products and services.

In accordance with the invention, content platforms may elect to include a system that facilitates users to donate virtual dollars, in association with e-commerce marketers exclusively, to preapproved charitable organizations. If an e-commerce marketer elects to match a virtual dollar donation, the combined virtual dollar match will be converted to U.S. dollars and donated jointly, by the user and marketer, to preapproved charitable organizations.

In accordance with the invention, licensed content providers encourage logins by rewarding a consumer's Time-On-Platform (TOP) with virtual dollars, e.g., One Minute TOP]=$1.00 Virtual Dollar. The accrual of virtual dollars as a reward for simply logging in encourages e-commerce marketers to offer more merchandise at discount, and users to purchase it.

The inventive matter sets forth an embodiment to initiate the movement of display screen elements of content publishers across digital media platforms, as commonalities exist on all such digital devices to send to server systems a request to display ads or remove ads.

The following description of eight consecutive drawings details a preferred embodiment of the invention for DCP on mobile phones. This description is not to be taken in a limiting sense, but is made for the purpose of illustrating general principles of embodiments of the invention. A flowchart that simplifies the method is followed by drawings that cover television and computers, as a means to illustrate that the inventive matter is transferable to several digital platforms, which is followed by charts that depict the nonobviousness of ad serving methods that grant user control of all advertising, with the patent eligible limitation that user has unconditional access to the content and does not have to display of any advertising, or perform any additional actions.

FIG. 1 depicting smartphone S without visible advertisements, comprising a machine-readable storage medium having stored thereon a computer program for associating personally identifiable information (PII) with advertising intelligence, and platform content C which is in accordance with a preferred embodiment of the invention, and can be seen from 10 illustratively indicates a graphical GUI the purpose of which is an indication of a single action that is to be performed to bring ads into view, based on user-centric insights derived from PII, and in response to the indicated single action being performed, sending to server system a request to display ads. Depicted at B GUI bar, GUI may conform to interface of DCP, e.g. top or bottom of screen, on a menu bar, and be of any typography, color, size, shape, or style of the platform GUI. (Designations smartphone S, mobile service provider logotype M, content provider logotype P, GUI bar B, do not warrant repeating in subsequent drawings).

Figure 2:
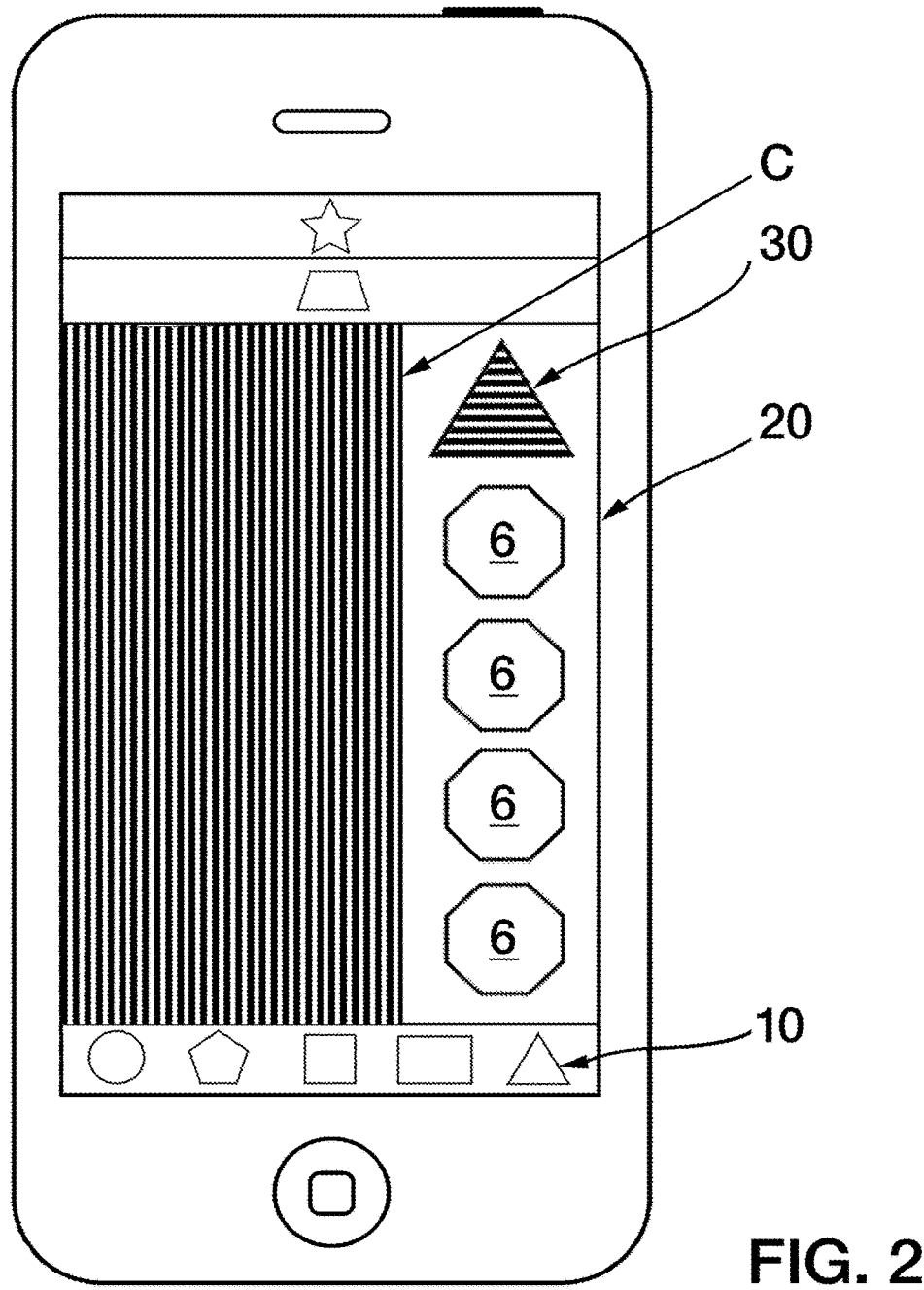
FIG. 2 is a depiction of a mobile phone illustrating an exemplary user advertising control method.
Figure 3:
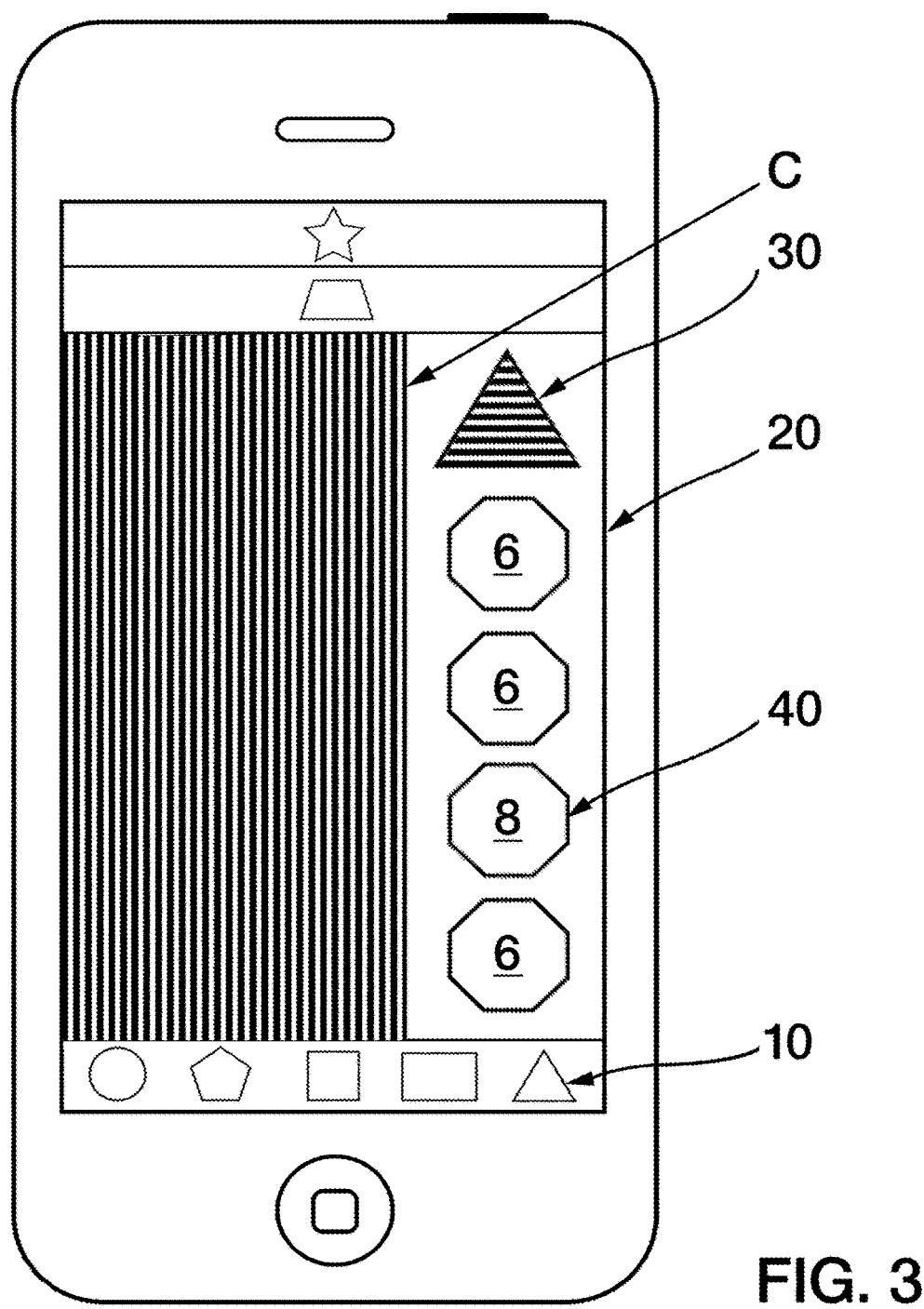
FIG. 3 is a depiction of a mobile phone to further illustrate an exemplary user advertising control.
Figure 10:
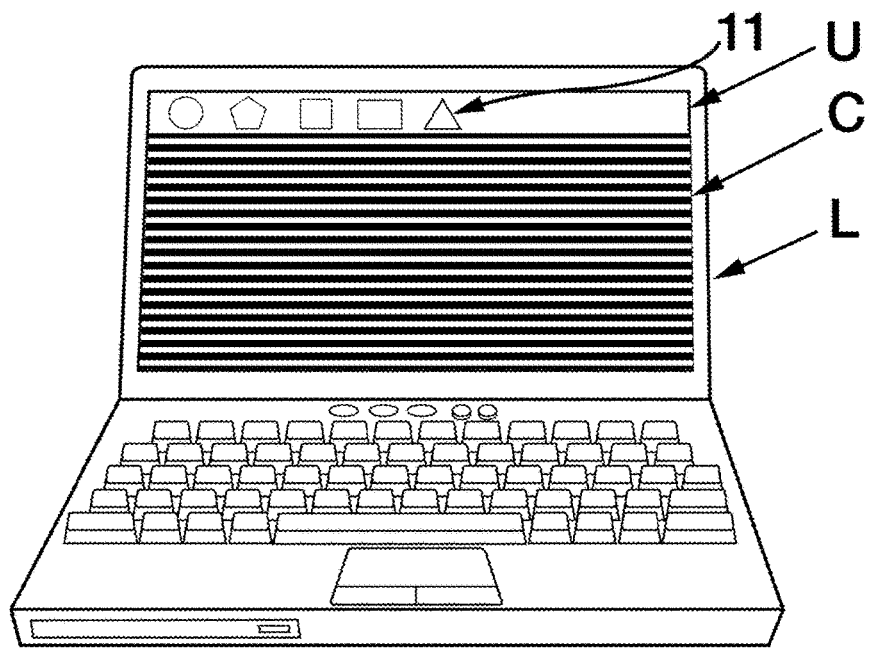
FIG. 10 is a depiction of a computer and a television illustrating an exemplary user control method.
Figure 10:
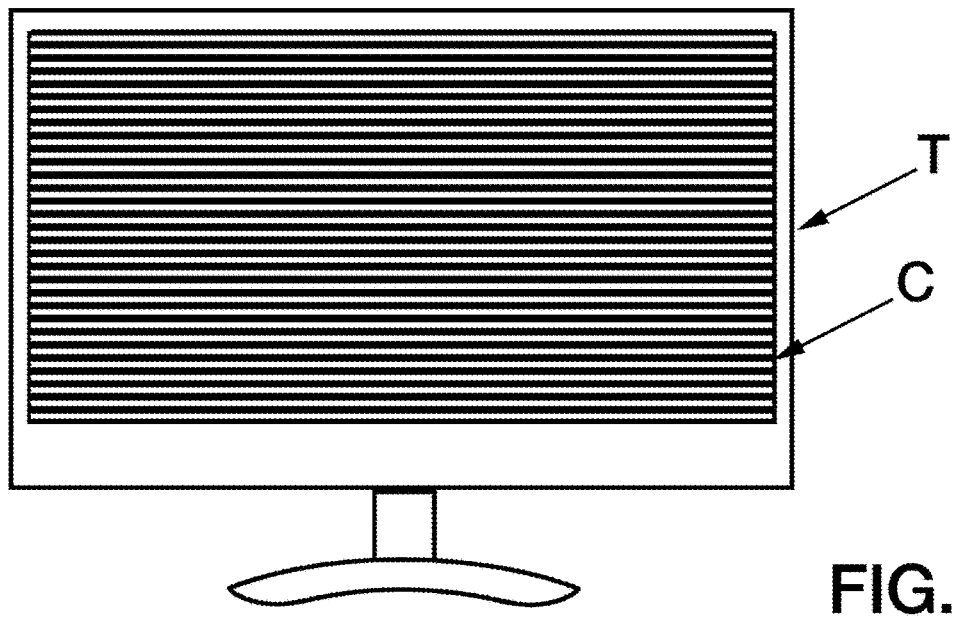

When tapped with one thumb or finger the GUI FIG. 2 10 slides content C left, as content sliders have become fundamental to online content design displaying several pieces of content in one location, in which such location 20 displays the preferred embodiment advertising Teaser Icon Screen and Teaser Icons 6 each of which representing standalone ad teasers for favorite brands, including but not limited to logos of favorite brands; teaser ad headlines; an assortment of photographs and illustrations as iconic visual representations of preferred brands, or any content combination continually cycling through 20, offering users considerable variety, all of which may be collectively placed under 30, the licensed content providers "umbrella" branding element of the embodiment, e.g., logo. The variety of demographic-appropriate Teaser Icons presented to users is the crux of preferred embodiment gamification. Inasmuch as only one teaser 6 may be tapped at a time, FIG. 3 40 exemplifies the game aspect 8, e.g., the game show, what's behind door number one, door number two and door number three, which still offers user unconditional access to the content without choosing to display advertising Teaser Icon Screens and Teaser Icons, or perform any additional actions.

Figure 4:
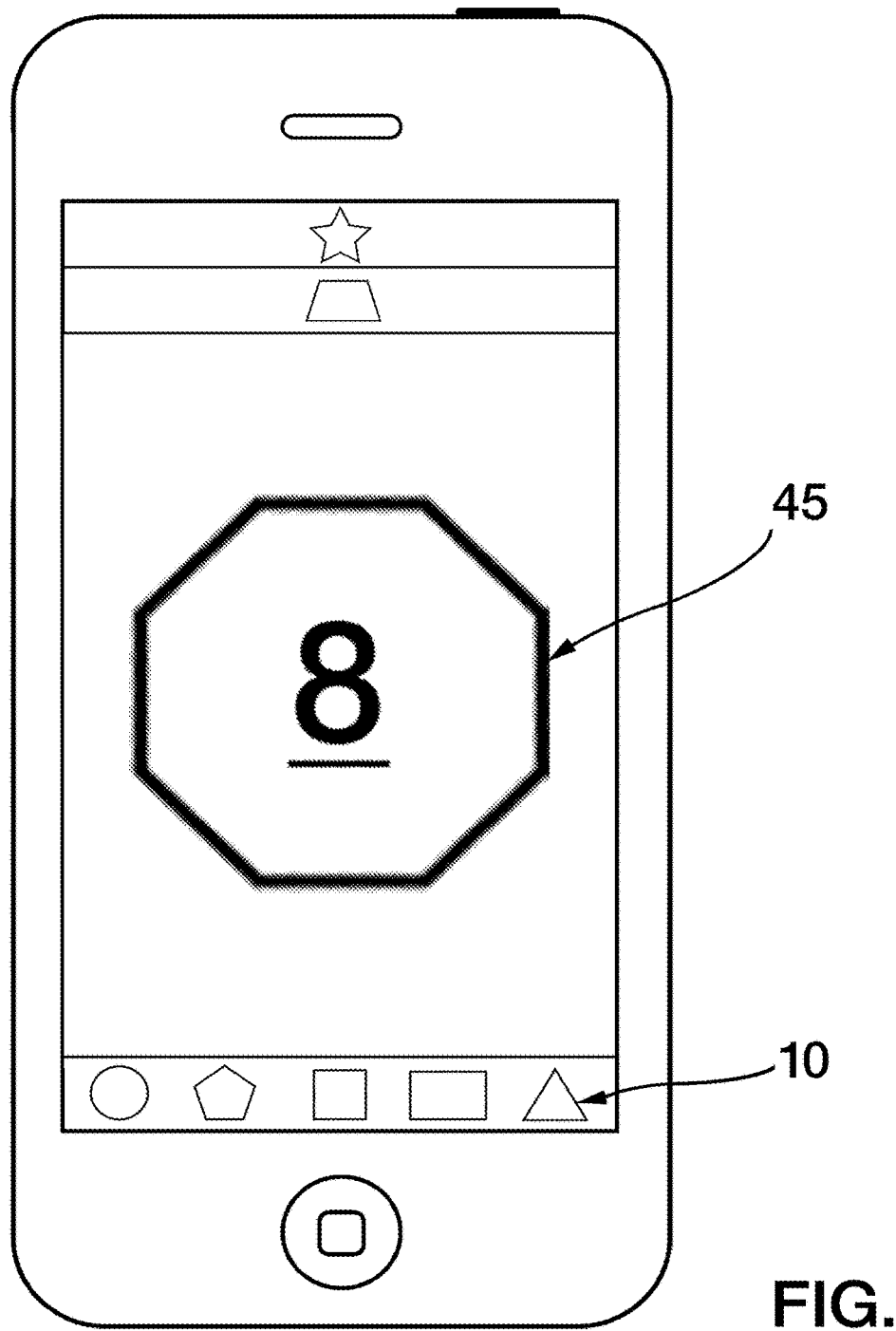
FIG. 4 is a depiction illustrating user preferred advertising introduction on mobile phone.

FIG. 4 45 could be any number of teased outcomes, including but not limited to display ads for preferred brands, a favorite brand new product introduction, a mobile device strategy of QR and UPC barcode scans for opporoune redemption of packaged goods, e-commerce impulse buying, or any marketing communications aligned with user database profile. Creative execution could embody six-second vine videos; an audio message and accompanying display ad; GPS retail location marketing; coveted merchandise literally awarded to user on the spot; the inventive matter virtual dollars; free movie tickets, all of which are teased then identified, as the fruition of gamification marketing described herein benefits users, content publishers, advertisers, and e-commerce marketers in equal measure, with the added user embodiments of control over the display of marketing materials, without any restriction to ad-supported digital content.

Figure 5:
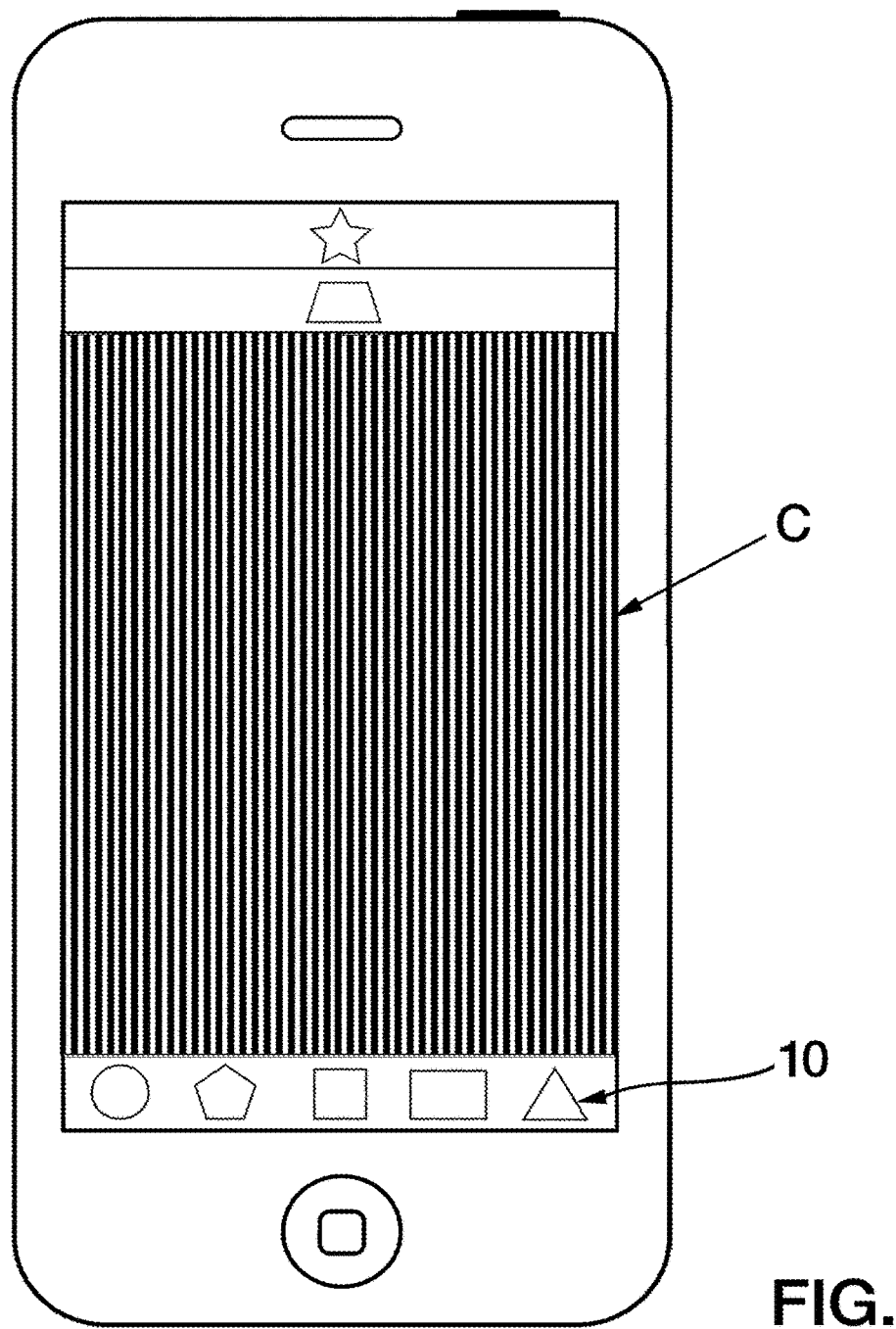
FIG. 5 is a depiction of additional inventive matter to grant user advertising control on mobile phone.
Figure 6:
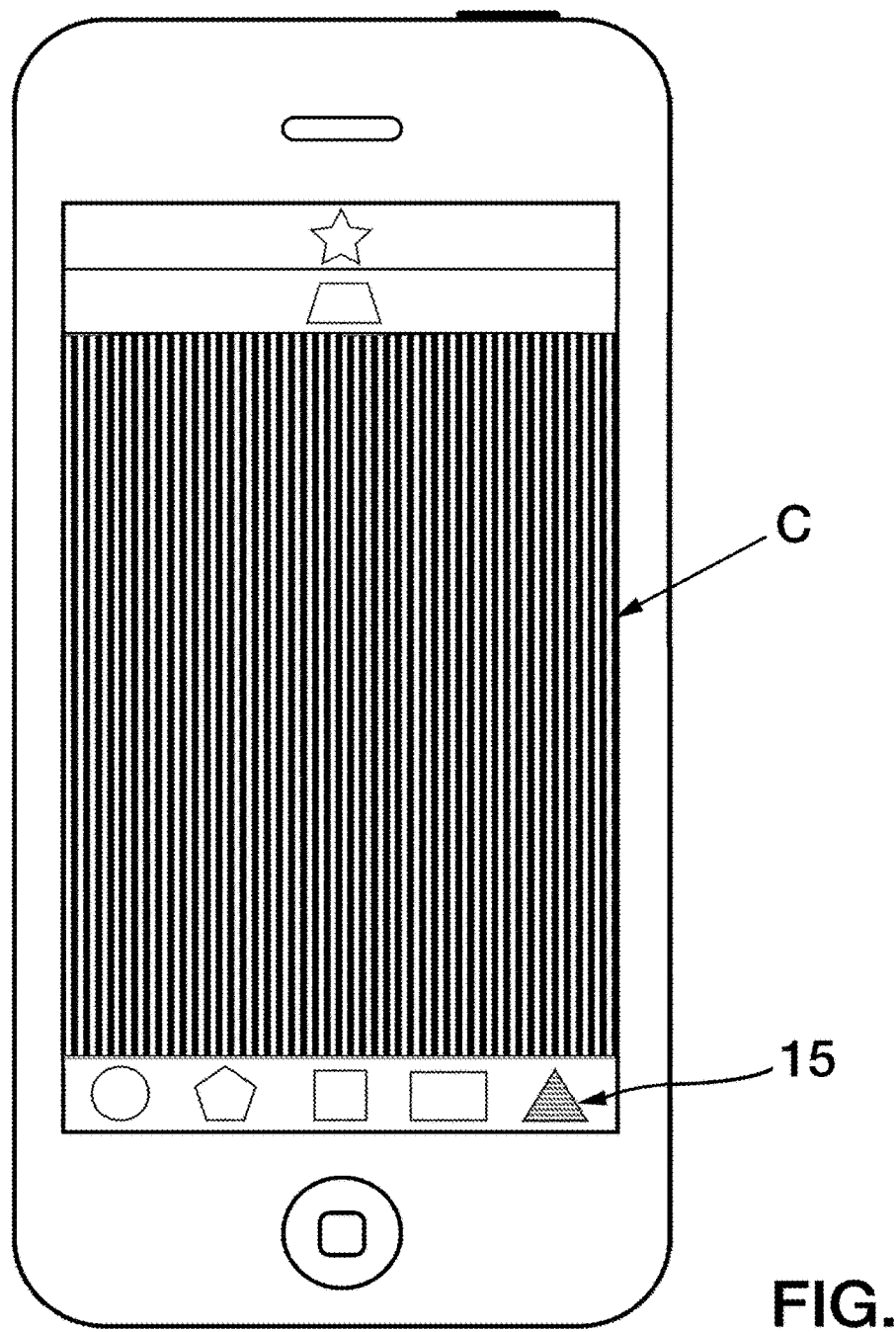
FIG. 6 is a depiction of exemplary inventive matter in regard to the introduction of preferred user advertising on mobile phone.
Figure 7:
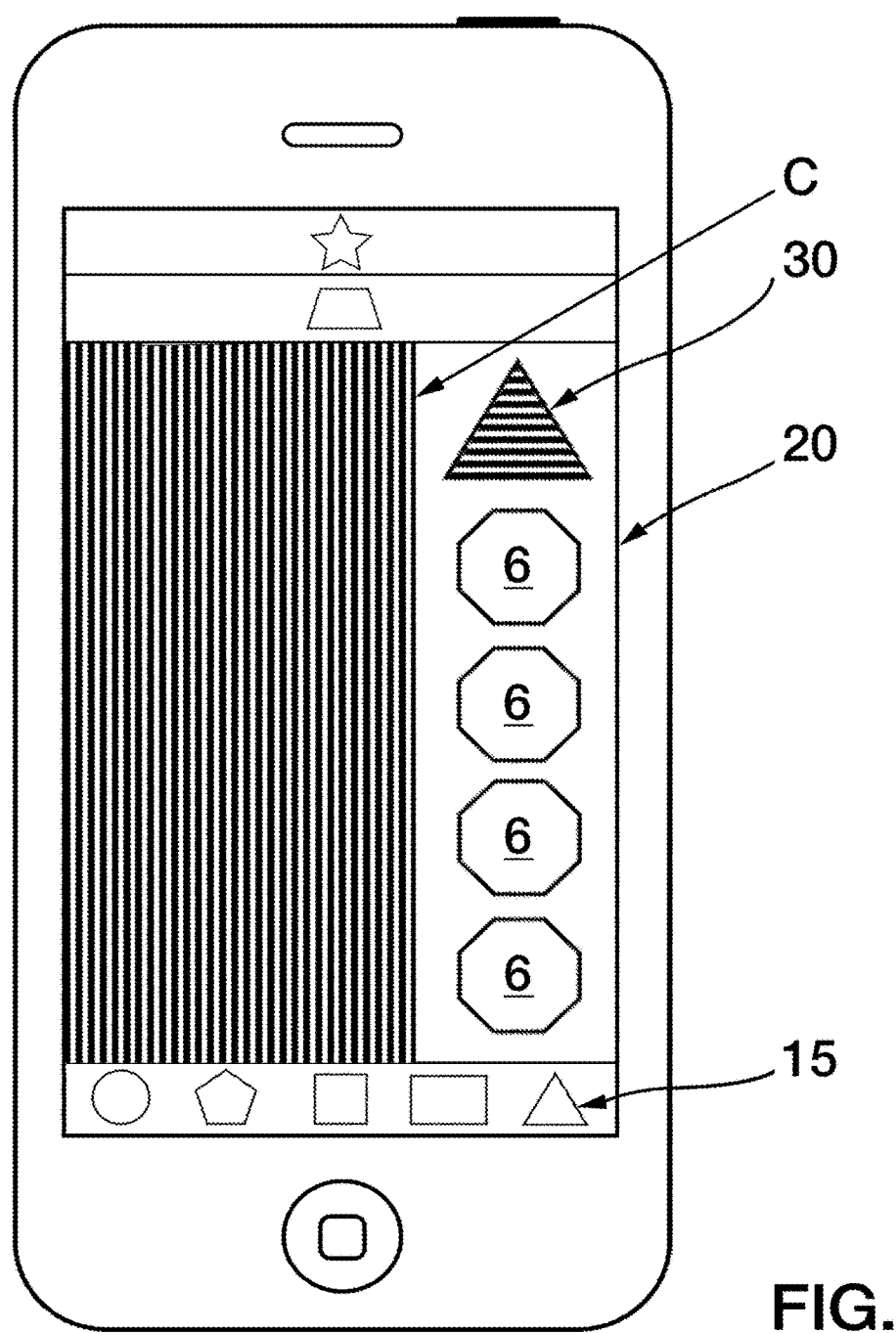
FIG. 7 is a depiction of additional inventive matter to grant user advertising user on mobile phone.
Figure 8:
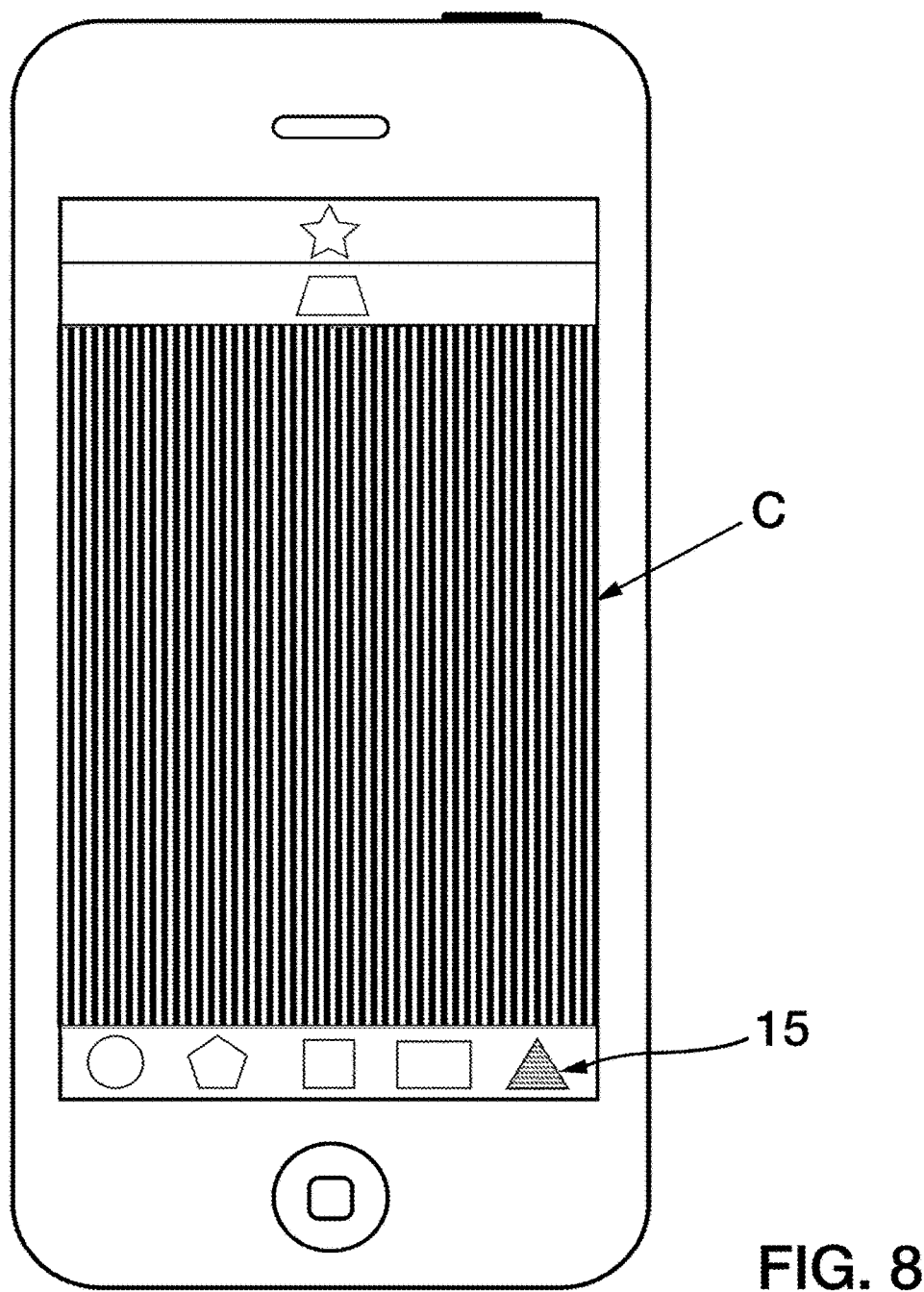
FIG. 8 is a flow chart of the methods of the present invention.

During Time-On-Platform (TOP) a user may tap the GUI FIG. 5 10 to return to the platform's content, sending to server system a request to remove ads. Additionally, during (TOP) Time-On-Platform, inventive matter codifies a further embodiment of user engagement, in which the GUI FIG. 6 15 may change color, size, shape, typography, or the style of command button icon, indicating action should be taken to bring ads into view, FIG. 7 20, as randomized notifications periodically signal specific opportunities regarding preselected brands or a targeted gamification reward, such as virtual dollars or a free flat screen TV. When tapped again 15 sends to server system a request to once again remove ads 6, thereby reinstating platform's content FIG. 8 C.

Figure 9:
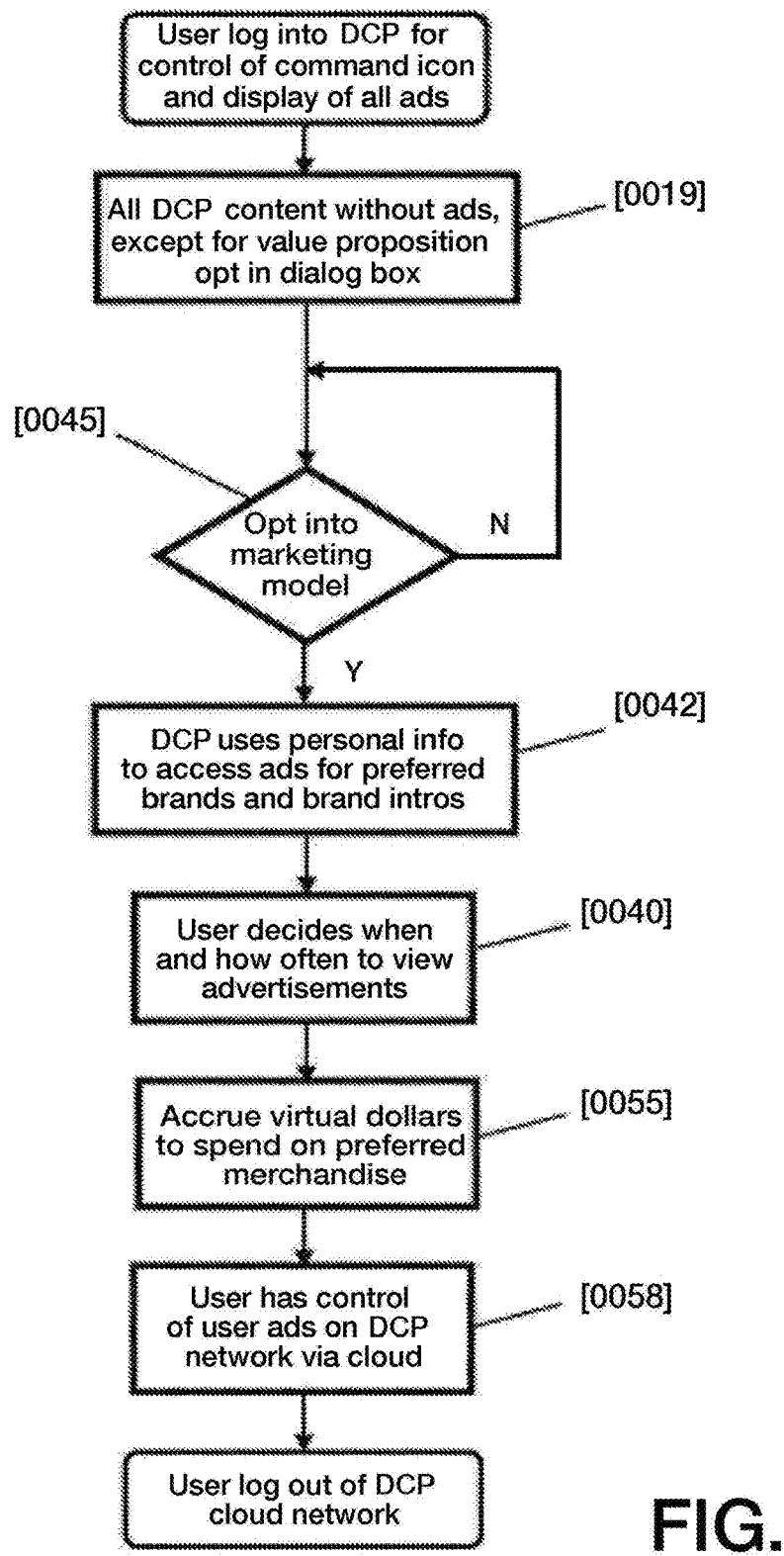
FIG. 9 is a depiction of a computer and a television to illustrate an exemplary user advertising control method.

FIG. 9 is a flowchart description of the present invention, and accompanying permission-based user incentives and rewards, and the cloud content network paradigm shift over prior art, in which callouts to specific material offers expanded text. As indicated the preferred embodiments, in relation to digital content platforms, integrates individualized sets of user preferred brands for retrieval, therefore the mapping is virtually the same across digital media platforms, wherein, for the sake of brevity, the detailed explanation of the smartphone drawings may be an applied to desk and laptop computer FIG. 9-FIG. 13. The differences, however, are noted, but uniformity reinforces accessibility and user engagement, which is an overarching embodiment of the present invention.

FIG. 10 is a depiction of a laptop computer L, which represents desk computers as well (not shown), illustrating content C and preferred embodiment GUI 11 to control all ad views; said GUI location, including, but not limited to, landing page, subsection pages; upper command bar U (as shown), bottom command bar, the header, sidebar, footer. FIG. 10 also depicts a television T, and TV content C. (Designations laptop L; upper nav U; television T, do not warrant repeating in subsequent drawings.)

Figure 11:
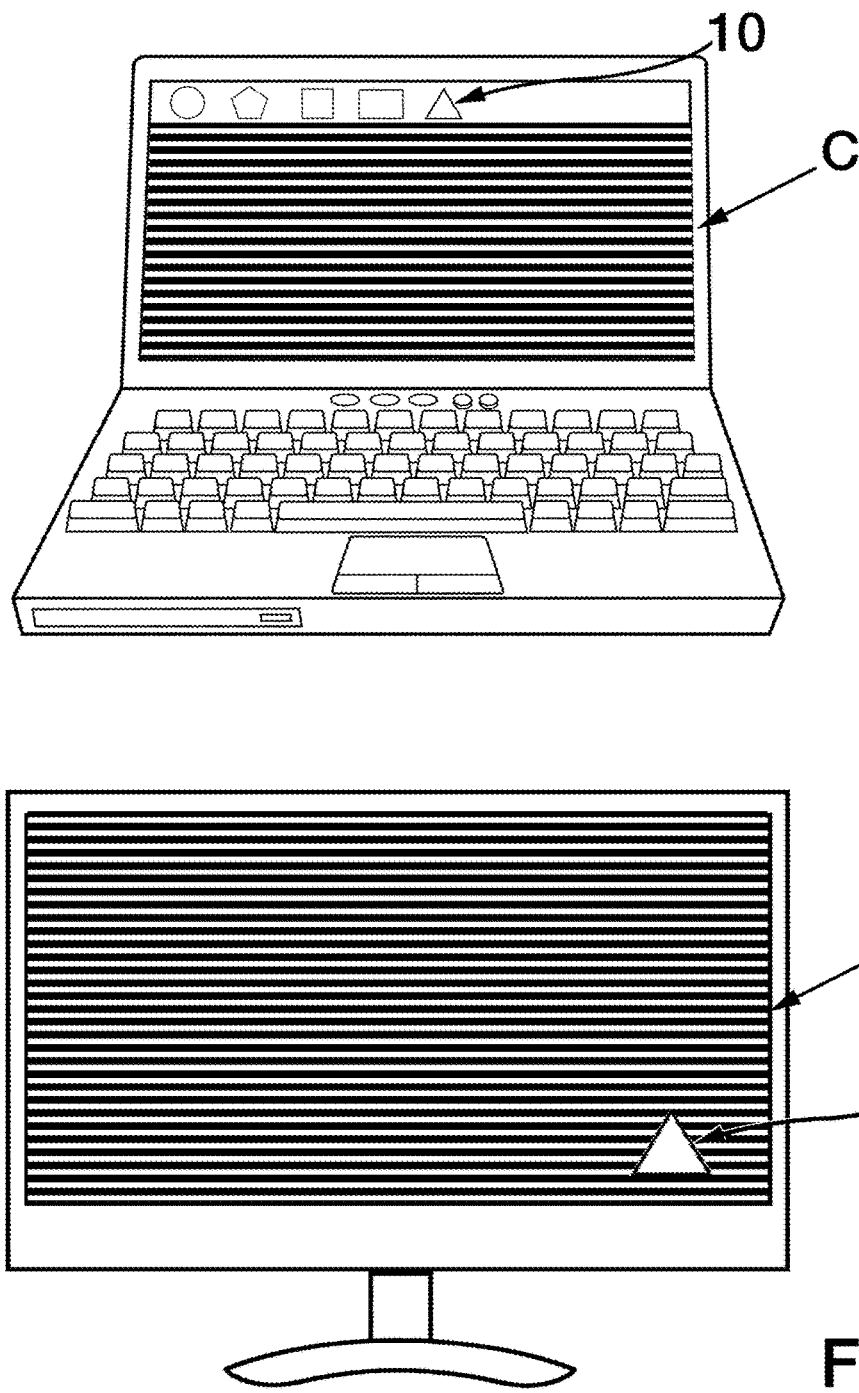
FIG. 11 is a depiction of a computer and a television that further illustrates an exemplary user advertising control.

FIG. 11 depicts a laptop computer and TV with content C, respectively. In accordance with the inventive matter, GUI 10, on both laptop and TV remote control (not shown), reinforces the conceit that a single action brings real-time, consumer-specific marketing intelligence into view regardless of the DCP, with the patent eligible limitation that user still has unconditional access to the televised content and does not have to perform any additional actions. Further, the on-screen TV GUI indicates an action on the TV remote to be taken to preview preferred brands and targeted gamification rewards. If action is taken, a preferred embodiment further mitigates annoying commercial interruptions and user ad-skipping. If the on-screen prompt is engaged, the program in progress is automatically downloaded to a DVR, to be resumed after said present invention interaction. If a DVR is not available, the command logo remains superimposed on screen at the conclusion of the program, signaling user engagement. Internet-ready televisions incorporate the aforementioned computer model, and will map accordingly.

Figure 12:
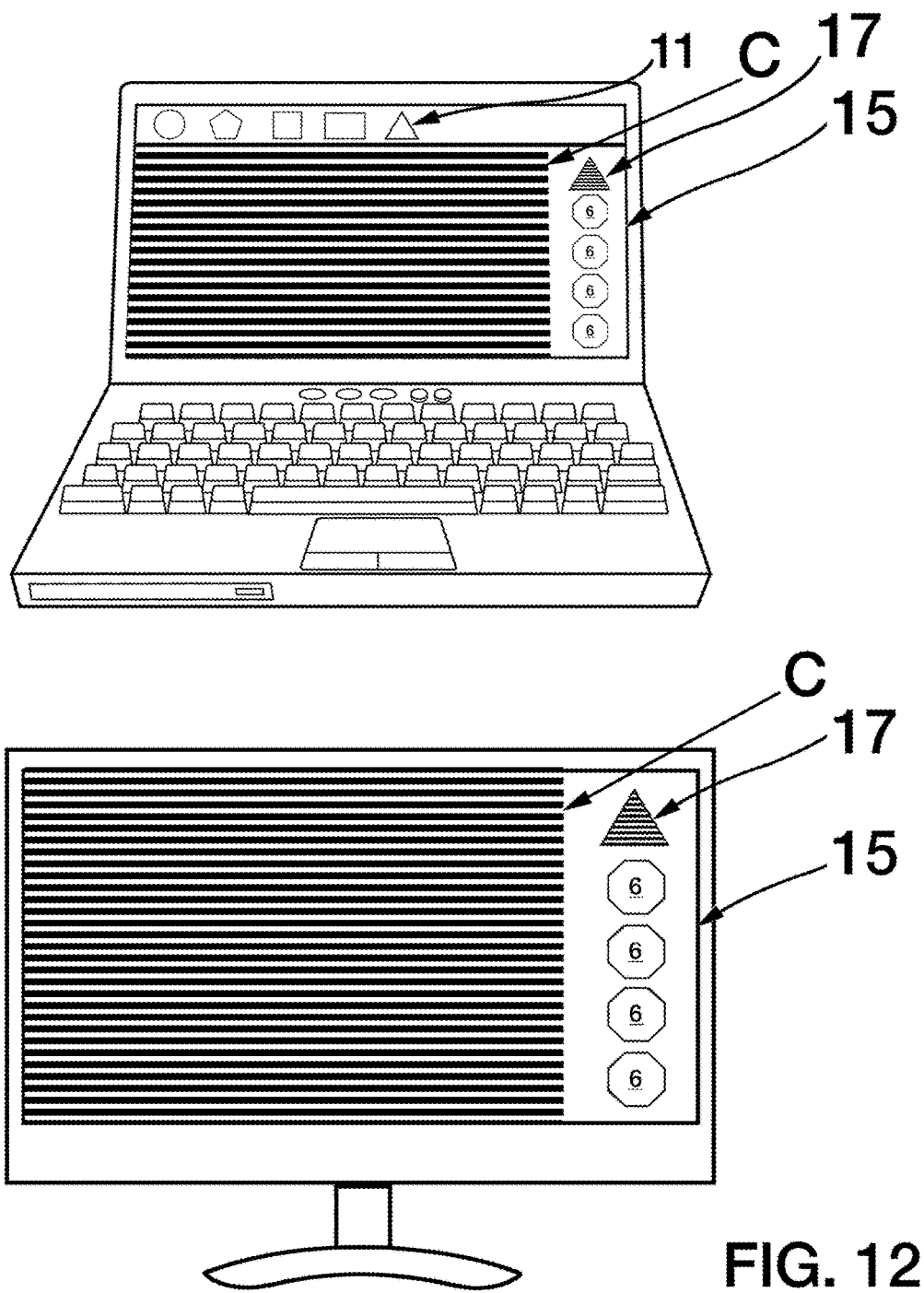
FIG. 12 is a depiction illustrating user preferred advertising introduction on a computer and a television.
Figure 13:
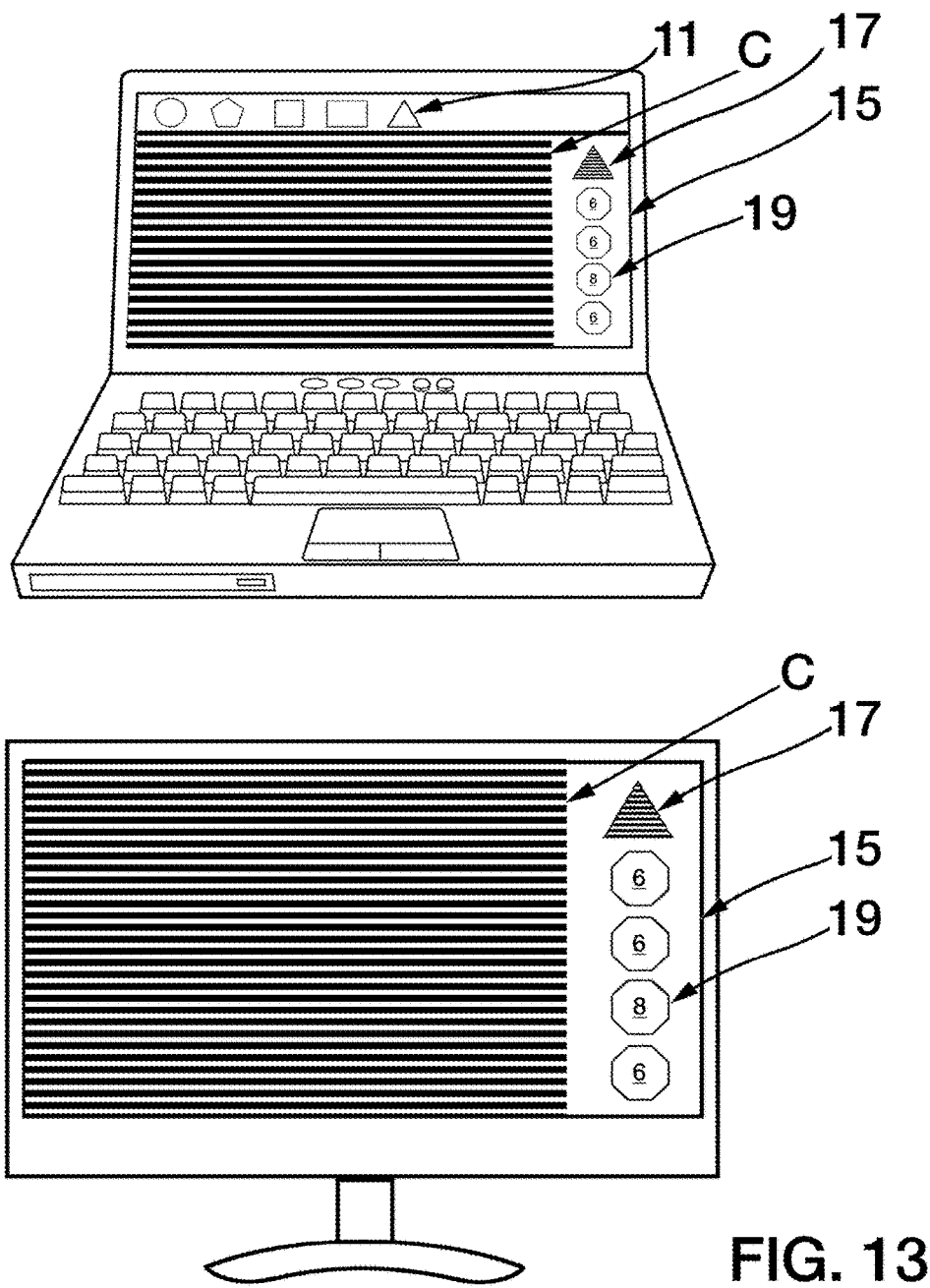
FIG. 13 is a depiction of additional inventive matter to grant user advertising control on a computer and a television.
Figure 14:
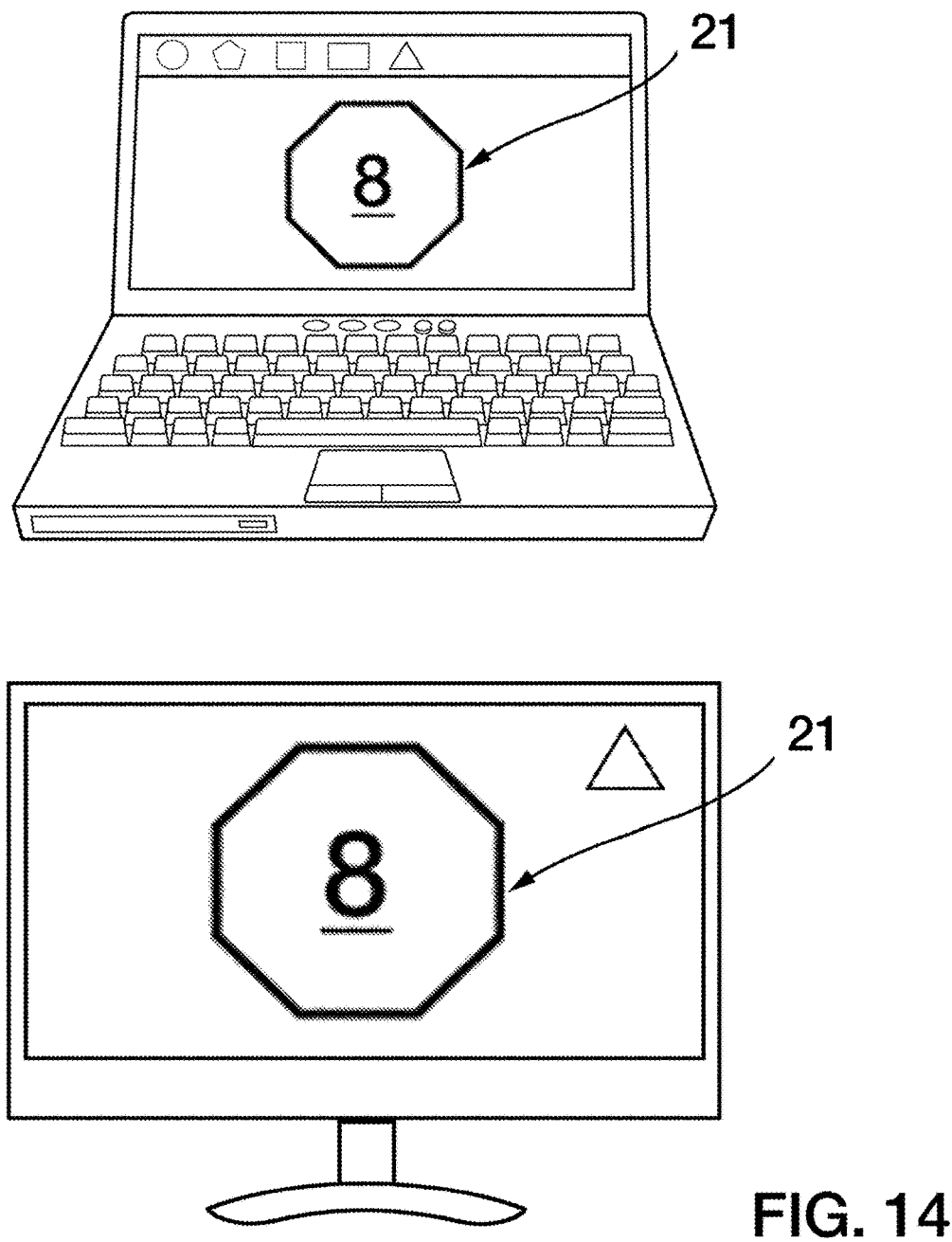
FIG. 14 is a depiction of a laptop computer and a television, each of which illustrates inventive matter to grant users control of digital advertising.

FIG. 12 depicts a laptop computer, TV, content C, and illustrates 6 embodiment Teaser Icons which continually cycle through location 15 to offer users considerable variety under 17 licensed content providers "umbrella" branding element. Additionally, FIG. 13 19 exemplifies computer and television brand tease 8 selection, which may include game component. FIG. 14 is a depiction of a laptop computer and a television, each of which illustrates the GUI activation of the single action to bring ads into view 21; wherein an ad appears on both laptop computer and TV.

Figure 15:
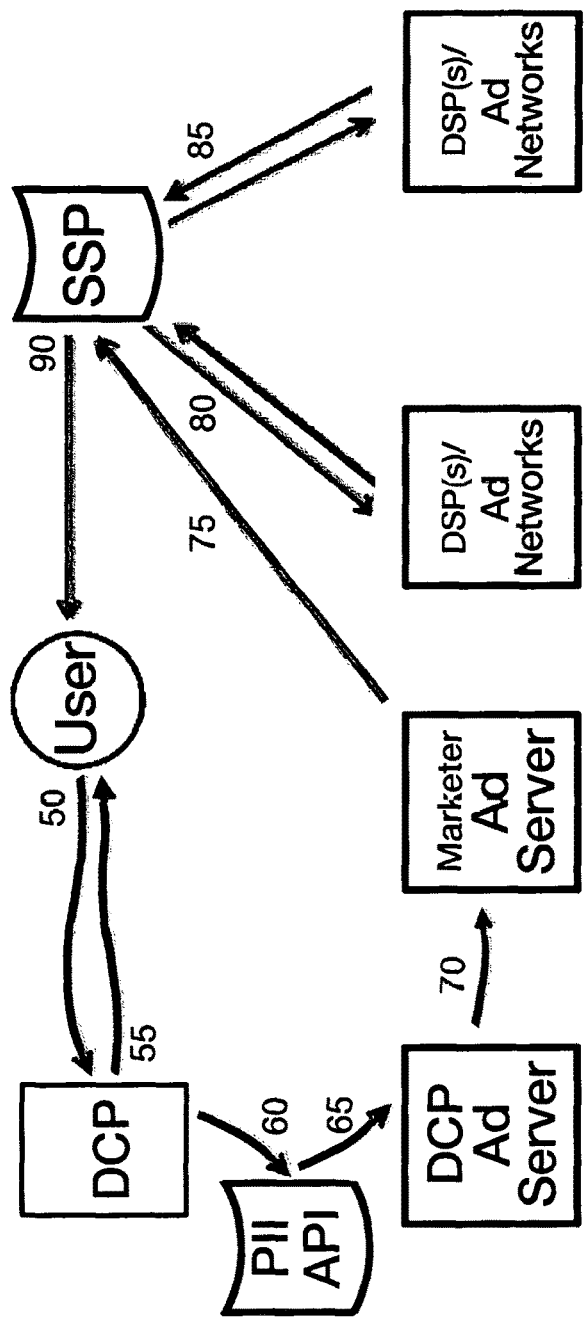
FIG. 15 is a chart that depicts PII-RTB ad serving process.
Figure 16:
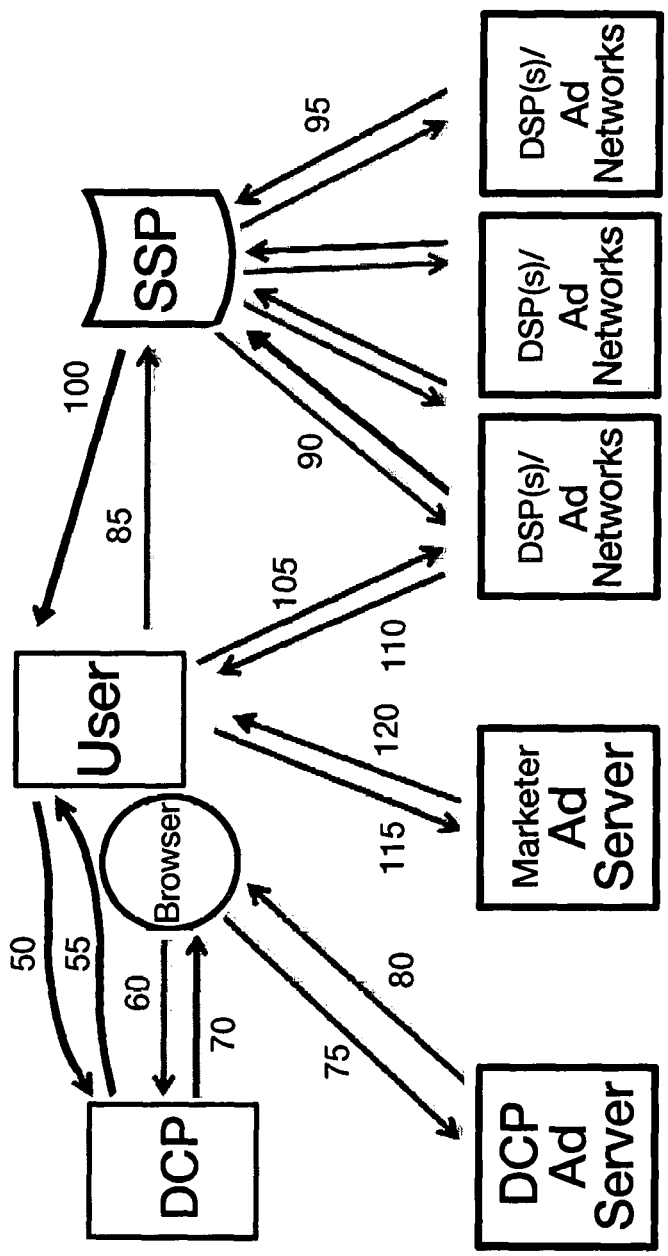
FIG. 16 is a chart that depicts behaviorally targeted advertising.

In one embodiment of the invention, FIG. 16 depicts an RTB behaviorally targeted advertising on DCP, with user control of the display of advertising, as follows: When user logs into DCP 50, which displays no third-party advertising, and the user chooses not to opt into the DCP value proposition dialog box advertisement, the user still has access to the GUI to control of the display of all advertisements, which includes the value proposition ad 55 (which will display periodically, upon icon command, to prompt trial at a later date). From here, the method is basically the same as typical RTB, except that user has sole discretion over the display the final advertisement. A browser navigates to a DCP 60; the DCP sends back code 70 that tells the browser where to get the content 75 and how to format it. Part of the code returned to the browser 80 will include an ad tag that passes information like the DCP ID and ad slot dimensions. From there, the SSP server 85 reads the user's SSP cookie ID; the SSP starts the auction by requesting bids from a host of demand sources, the DSPs 90. If there is no SSP cookie on the machine, the ad inventory can technically still be auctioned, but since nothing is known about the user, the price will be very low. For the DSPs to truly value the impression though, they need to know something about the user that will presumably view it. However, packaged with the bid request is the SSP's cookie ID, along with the URL the impression will deliver on, and the current user's frequency on the DCP. All these factors help the DSP value the impression. First, DSPs are able to match the SSP's cookie ID to their own cookie on that user, which is tied to a cache of marketer data and 3rd party data. Using the cookie ID, the DSP will be able to know if that user recently priced out a car, is flying to Paris in the next 90 days, was recently shopping for shoes, and even more general demographic information about the user such as their age, gender, income range, credit score, etc. In addition to the cookie though, where the ad will appear, the URL, is also important. Many brands don't want their ads to appear on just any DCP even if they want that user. If the user is on a platform with PG-13 content, for example, the advertiser might bid a lower amount or not at all. Similarly, the frequency of that user to the platform they are on is also important to valuation. Advertisers are willing to pay a premium to reach users on their first or second page view on a platform vs. their 50th page view for the simple fact that users are less engaged with platform content and more likely to respond to an ad during their first few page views. Using those pieces of data, the DSPs all value that impression and submit a bid back to the SSP 95 as well an ad redirect to send the user should their bid win the auction. The SSP picks the winning bid and passes the DSP's redirect back to the user 100. From here the process is basically the same as third party ad serving—The user calls the DSP 105, the DSP sends the user the marketer's ad server redirect 110, and user calls the marketer's ad server 115 and the marketer serves the user the final ad 120. However, the DCP has granted the user the right not to view behaviorally targeted advertising, as only the action of the command button icon, which is solely under user control, can display and remove advertising on the DCP.

in another embodiment of the present invention, FIG. 15 depicts an PII-RTB ad serving process as follows: When user logs into DCP 50, which displays no third-party advertisements, and user chooses to opt into DCP value proposition, user grants DCP access to user PII while DCP, in turn, grants user total control of the display of all advertisements through the permanently displayed GUI 55. Further, user opt into value proposition grants DCP permission to send user ID to enterprise data 60, thereby matching enterprise data services API to user PII. The API accepts PII as input 65 and performs highly accurate entity resolution using that PII and then passes data bundle enhancements associated with that PII API to the DCP Ad Server. (Some integrations can only accept data when the event is sent from the browser. They require events on the client since they rely on cookies and most of those tools do not have an API that Segment can send server-side data. In this regard, DCP may access behaviorally targeted advertising.) The DCP Ad Server bundles the enterprise date user PII API with information like the DCP's ID, ad slot dimensions and RTB-enabled SSP, which then passes to the Marketer Ad Server 70. From there, the Marketer Ad Server calls the SSP server 75 where the SSP reads that SSP ID, and starts the auction by requesting bids from a host of demand sources, the DSP(s).

Since the PII AP knows so much about the user, the price will be high and will more readily integrate with the DCP context. The DSPs can truly value the impression, because they know about the user who is (presumably going to see it. All these factors help the DSP value the impression. For example, the DSP will be able to know household demographics, adult age ranges, children's age ranges, number of adults and number of children in the household, marital status, household interests, interest categories include reading, food/cooking, travel, exercise, health/self-improvement, hobbies, pets, sports, collectibles, investments, computers, electronics, home improvement, games/contests, photography, etc. True enterprise data is far and away the driver of higher bids. Advertisers are willing to pay a premium to reach users on their first or second page view on a platform vs. their 50th page view for the simple fact that users are less engaged with DCP content and more likely to respond to an ad during their first few page views. Using those pieces of data, the DSPs all value that impression and submit a bid back to the SSP 80-85. The SSP picks the winning bid 90, which still leaves the user to decide whether or not to initiate the GUI to display the advertising, completing the inventive matter of the PII-RTB ad serving process.

In accordance with the invention, the primary problem of user objection to the prior art is solved when content providers grant users control of the quality and relevance of ads for preferred products and services, and when and how often these ads are displayed. A preferred embodiment for user control of all advertisements on digital media platforms comprises a method wherein digital media platforms do not display advertisements; however, they do display a GUI that is to be initiated by the user to display advertisements, and in response to only the indicated single action being performed, the user sends to a server system a request to display advertisements. In addition, the same GUI may be initiated by the user to remove advertisements, and in response to only the indicated single action being performed, the user sends to a server system a request to remove the all advertisements.

The present invention is nonobvious and relies on a computer to perform the specific steps and limitations, as follows: (1) The GUI is not advertising and it is displayed with the content, which takes it out of the realm of a pop-up menu. (2) The GUI only requires a single action for the "on/off" and off means all advertising is off, which again takes it out of being a menu with options or a teaser, whereas teasers in respect to the present invention constitute advertising, because the display teasers are initiated by the single action of the icon. (3) Selecting the icon provides an indication to the digital media platform and affects the control at that level, which takes it out of the realm of a toolbar app that removes/filters advertising locally. (4) The user still has unconditional access to the content and does not have to perform any additional actions, which takes it out of presenting a subscription menu, reminders, pop-ups or some other requirement when the advertising is off. The art of record that removes or limits advertising places restriction on the user's ability to access data without ads and/or requires the user perform some action that generates value, such as pay a fee. The novelty of the present invention rests in the simplicity of a GUI that is always displayed and acts as both an on and an off switch for advertising, with the additional requirements that all advertising is stopped, allowing full access to content and not requesting further user interactions beyond providing the icon, which places the user in complete control of advertising without any of the restriction described in the related art.

The invention claimed is:

1. A computer-implemented method for granting user control of display of advertising on a digital content platform, comprising the steps of:
    receiving, at a server, from a plurality of users, a user request, initiated by a an "on" action of an "on/off" graphical user interface command button icon (GUI) on a digital content platform (DCP);
    requesting, from the server, automated analytic access to big data;
    retrieving personally identifiable information (PII) of said user; and
    displaying user-centric advertisements on the DCP from a plurality of ad-serving networks;
    receiving, at the server, from a plurality of users, a user a request, initiated by an "off" action of the "on/off" of said GUI on said DCP; and
    requesting, from the server, to remove the displaying of any advertisements on said DCP;
    granting DCP unconditional permission to generate a user Personally identifiable Information (PII) profile;
    applying big data analytics to the user PII profile:
    sorting PII profile based on user-centric insights;
    matching user-centric insights with ad-serving networks;
    displaying on the DCP user-centric advertisements; and
    initiating a subsequent single user action of said GUI, constituting an "off of the "on/off" action of said command button icon;
    requesting from the server to remove all advertisements on the DCP.

2. The method of claim 1, further comprising a non-transitory machine readable storage medium having stored thereon a computer program for connecting PII with advertising intelligence, the computer program comprising a set of instructions for causing the machine to perform the steps of:
    receiving a unique identifier of a user;
    initiating said GUI on the DCP;
    accepting, from the server, user request to display advertisements on the DCP;
    granting DCP unconditional permission to generate the user PII profile;
    applying big data analytics to the user PII profile;
    sorting PII profile based on user-centric insights;
    correlating user-centric insights with ad-serving networks;
    displaying on the DCP user-centric advertisements;
    transmitting the DCP ecosystem, through cloud computing, with unique identifier of said user and user-centric advertisements;
    and storing said user-centric advertisements on the non-transitory machine readable storage medium.

3. The method of claim 1, further comprising said DCP not displaying third-party advertisements on the DCP upon user login.

4. The method of claim 1, further comprising said DCP to permanently display the GUI on the DCP.

5. The method of claim 2, further comprising said DCP displaying, upon user login, only an advertisement for the DCP, in a form of a value proposition dialog box, wherein a user selectively indicates, via the GUI, either acceptance or rejection of the proposition; granting, upon acceptance, said DCP access to the PII of user; and correlating user-centric insights with ad-serving networks.

6. The method of claim 4, further comprising said DCP to setup and run on said DCP an advertising network; correlating user-centric insights with ad-serving networks; accessed from a plurality of ad networks.

7. The method of claim 1, further comprising: requesting from said server to display advertisements on the DCP gives user control of the display of all advertisements on DCP; and requesting from said server not to display advertisements on the DCP gives user control of the display of all advertisements on DCP.

8. The method of claim 6, further comprising: requesting from said server not to display advertisements on the DCP nevertheless grants user unconditional access to all content on said DCP, without requiring any additional actions performed by user.

9. The method of claim 1 further comprising initiating said GUI, wherein the predefined action is a click of a mouse button.

10. The method of claim 1, further comprising initiating said GUI, wherein the predefined action is a manipulation of a trackpad.

11. The method of claim 1 further comprising initiating said GUI, wherein the predefined action is a tap of a touch screen.

12. The method of claim 1 further comprising initiating said GUI, wherein the predefined action is a depress of a remote control device.

13. An apparatus, comprising:
a processor;
a memory storing instructions that causes the processor to perform operations during execution of the instructions, the operations comprising:
receiving, at a client-server, from a plurality users, a user request, initiated by a graphical user interface (GUI) command button icon on a digital content platform (DCP);
requesting, from the server, to remove the displaying of any advertisements on said DCP;
receiving, at said client-server, from a plurality said users, a user request from a client, initiated by said GUI on said DCP;
requesting from the server to display advertisements on the DCP;
retrieving, by the server, personally identifiable information (PII) with ad-serving information;
granting DCP unconditional permission to generate a user Personally identifiable Information (PII) profile;
applying big data analytics to the user PII profile;
sorting PII profile based on user-centric insights;
matching user-centric insights with ad-serving information; and
displaying on the DCP user-centric advertisements.

* * * * *